US012760718B2

(12) United States Patent
Hart et al.

(10) Patent No.: US 12,760,718 B2
(45) Date of Patent: Oct. 13, 2026

(54) ACTUATOR ASSEMBLY

(71) Applicant: CAMBRIDGE MECHATRONICS LIMITED, Cambridge (GB)

(72) Inventors: Oliver Hart, Cambridge (GB); Peter Van Wyk, Cambridge (GB); Andrew Benjamin Simpson Brown, Cambridge (GB); David Ooi, Cambridge (GB); Joshua Carr, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 918 days.

(21) Appl. No.: 17/927,310

(22) PCT Filed: May 27, 2021

(86) PCT No.: PCT/GB2021/051296
§ 371 (c)(1),
(2) Date: Nov. 22, 2022

(87) PCT Pub. No.: WO2021/240164
PCT Pub. Date: Dec. 2, 2021

(65) Prior Publication Data

US 2023/0204900 A1 Jun. 29, 2023

(30) Foreign Application Priority Data

May 27, 2020 (GB) ...................................... 2007949

(51) Int. Cl.
*F03G 7/06* (2006.01)
*G02B 7/09* (2021.01)
*G03B 13/36* (2021.01)

(52) U.S. Cl.
CPC ....... *F03G 7/0665* (2021.08); *F03G 7/06143* (2021.08); *G02B 7/09* (2013.01); *G03B 13/36* (2013.01); *G03B 2205/0076* (2013.01)

(58) Field of Classification Search
CPC ............ G03B 13/36; G03B 2205/0046; G03B 2205/0053; G03B 2205/0076; G03B 3/10;
(Continued)

(56) References Cited

U.S. PATENT DOCUMENTS 5,586,467 A * 12/1996 Weber .................. F16H 25/186
74/567
10,309,504 B2 * 6/2019 Wang .................... F16H 25/186
(Continued)

FOREIGN PATENT DOCUMENTS

CN 109254472 A 1/2019
CN 110780415 A 2/2020
(Continued)

OTHER PUBLICATIONS

GB Search Report and Examination Report of GB Application 2007949.7 dated Nov. 6, 2020.
(Continued)

*Primary Examiner* — Anthony Ayala Delgado
(74) *Attorney, Agent, or Firm* — Van Hoven PC; Stefan D. Osterbur; Joshua Van Hoven

(57) ABSTRACT

The actuator assembly comprises a first part (102), a second part (110) and a helical bearing arrangement. The helical bearing arrangement is arranged to guide helical movement of the second part with respect to the first part around a helical axis H such that rotation of the second part around the helical axis is converted into helical movement of the second part. The first and second parts comprise respective stops (152, 162) that are arranged such that the stops are spaced from each other throughout an operating range of said helical movement of the second part relative to the first part. The stops are configured to engage if the second part is moved relative to the first part in at least one direction other than the direction of said helical movement such that the
(Continued)

engagement of the stops restricts relative movement of the first and second parts.

20 Claims, 19 Drawing Sheets

(58) Field of Classification Search
CPC ..... G03B 5/02; F03G 7/0614; F03G 7/06143; F03G 7/0665; G02B 7/005; G02B 7/023; G02B 7/04; G02B 7/09
See application file for complete search history.

(56) References Cited

U.S. PATENT DOCUMENTS

| | | | | |
|---|---|---|---|---|
| 2009/0201595 | A1* | 8/2009 | Matsumoto | G02B 7/023 359/822 |
| 2014/0123789 | A1* | 5/2014 | Saunders | F16H 25/12 74/89.23 |
| 2019/0018259 | A1* | 1/2019 | Minamisawa | G03B 5/06 |
| 2019/0273849 | A1* | 9/2019 | Schottner | G02B 7/026 |
| 2019/0373143 | A1 | 12/2019 | Overmann | |
| 2025/0237875 | A1* | 7/2025 | Wang | G02B 27/0176 |

FOREIGN PATENT DOCUMENTS

| | | | |
|---|---|---|---|
| GB | 2575026 | A | 1/2020 |
| JP | 2017067909 | A | 4/2017 |
| WO | 2010029316 | A2 | 3/2010 |
| WO | 2010089529 | A1 | 8/2010 |
| WO | 2011104518 | A1 | 9/2011 |
| WO | 2012020212 | A1 | 2/2012 |
| WO | 2012038703 | A2 | 3/2012 |
| WO | 2012066285 | A1 | 5/2012 |
| WO | 2013175197 | A1 | 11/2013 |
| WO | 2014076463 | A1 | 5/2014 |
| WO | 2019164296 | A1 | 8/2019 |
| WO | 2019243849 | A1 | 8/2019 |
| WO | 2020099897 | A1 | 5/2020 |

OTHER PUBLICATIONS

International Search Report and Written Opinion of PCT/GB2021/051296 dated Sep. 15, 2021.
Chinese Patent Application No. 202180036972.4, First Office Action and Machine Translation dated May 26, 2025, 19 pages.
International Preliminary Report on Patentability for International Application No. PCT/GB2021/051296, dated Dec. 8, 2022, 8 Pages.
Office Action for Indian Application No. 202227056540, dated May 6, 2026, 8 pages.

* cited by examiner

ACTUATOR ASSEMBLY

CROSS-REFERENCE TO RELATED APPLICATIONS

This application is a national stage application under 35 U.S.C. § 371 of International Application No. PCT/GB2021/051296, filed May 27, 2021, which claims priority of GB Patent Application No. 2007949.7, filed May 27, 2020, the disclosures of each of which are hereby incorporated by reference herein in their entireties.

FIELD

The present disclosure relates to an actuator assembly and to a camera system comprising an actuator assembly.

BACKGROUND

It is known to use SMA wires in actuators to drive movement of a movable element with respect to a support structure. Such SMA actuators have particular advantages in miniature devices such as smartphones. SMA actuators may be used for example in optical devices such as compact camera modules for driving movement of lenses along their optical axis, for example to effect focussing (e.g. autofocus, AF) or zoom.

For example, WO 2019/243849 A1 describes a shape memory alloy actuation apparatus which comprises a support structure and a movable element. A helical bearing arrangement supported on the movable element on the support structure guides helical movement of the movable element with respect to the support structure around a helical axis. At least one shape memory alloy actuator wire is connected between the support structure and the movable element in, or at an acute angle to, a plane normal to the helical axis, so as to drive rotation of the movable element around the helical axis which the helical bearing arrangement converts into said helical movement.

If such an actuator is subjected to an impact, for example by being dropped from a height, then this can cause the moveable element to be urged relative to the support structure by way of a non-helical motion, which may damage components of the actuation apparatus. It would be desirable to reduce the likelihood of damage to the components of the actuator in such circumstances.

SUMMARY

According to a first aspect of the present invention, there is provided an actuator assembly comprising: a first part; a second part; and, a helical bearing arrangement arranged to guide helical movement of the second part with respect to the first part around a helical axis such that rotation of the second part around the helical axis is converted into helical movement of the second part, wherein the first and second parts comprise respective stops that are arranged such that the stops are spaced from each other throughout an operating range of said helical movement of the second part relative to the first part, and wherein the stops are configured to engage if the second part is moved relative to the first part in at least one direction other than the direction of said helical movement such that the engagement of the stops restricts relative movement of the first and second parts.

The stops help to prevent damage to the components of the actuator assembly if the actuator assembly is subjected to an impact.

In some embodiments, the actuator assembly is a shape memory alloy (SMA) actuator assembly and/or a miniature actuator assembly.

The at least one direction other than the direction of said helical movement may involve translational and/or rotational degrees of freedom of the second part relative to the first part (or their equivalents in a helical coordinate system).

The directions—i.e. the direction of said helical movement and the at least one direction other than the direction of said helical movement—may be defined with reference to the relative movement of the stops (or points near the stops). Generally, movements of the second part relative to the first part can be approximated by a 'local' translational relative movement of the stops.

In some embodiments, the at least one direction other than the direction of said helical movement is perpendicular to the direction of said helical movement, e.g. at the stops.

In some embodiments, the at least one direction other than the direction of said helical movement is perpendicular to the helical axis.

In some embodiments, the stop of the first part comprises a first surface.

In some embodiments, the stop of the second part comprises a second surface.

In some embodiments, the first surface does not face in a direction that is normal (and/or parallel) to an axis parallel to the helical axis and/or the second surface does not face in a direction that is normal (and/or parallel) to an axis parallel to the helical axis.

In some embodiments, the first and/or second surface is helically arranged. In other words, the first and/or second surface is substantially parallel with the direction of the helical movement thereof.

In some embodiments, the stops are spaced by a substantially constant distance in a first direction during at least a portion of said helical movement of the second part relative to the first part, and wherein the stops are configured to engage if the stop of the second part is moved relative to the stop of the first part in said first direction.

In some embodiments, the stops are arranged such that the stops are spaced by the substantially constant distance in the first direction over the entire range of said helical movement of the second part relative to the first part.

In some embodiments, the stops are arranged such that the stops are spaced by a substantially constant distance in the first direction during a first portion of said helical movement of the second part relative to the first part.

In some embodiments, the first and second parts each comprise respective second stops that are arranged such that the second stops are spaced by a substantially constant distance during a second portion of said helical movement of the second part relative to the first part.

In some embodiments, one of the first and second parts comprises a track that comprises the stop of said one of the first and second parts.

In some embodiments, the other one of the first and second parts comprises a protrusion for being received in the track, wherein the protrusion comprises the stop of said other one of the first and second parts.

In some embodiments, the track extends into an inner surface of said one of the first and second parts and the protrusion protrudes from an outer surface of the other one of the first and second parts.

In some embodiments, the first part comprises the track and the second part comprises the protrusion.

In some embodiments, the second part is at least partially located within the first part.

In some embodiments, the first part comprises a space and at least a portion of the second part is received within the space. The space may be an aperture that extends through the first part.

In some embodiments, the substantially constant distance is at least 50 microns and, preferably, is at least 75 microns, at least 100 microns, at least 125 microns or at least 150 microns.

In some embodiments, the substantially constant distance is less than 250 microns and, preferably, is less than 200 microns or less than 150 microns.

Rather than being substantially constant, the actuator assembly may be configured such that the distance changes by less than a predetermined relative or absolute amount during at least the portion of said helical movement of the second part relative to the first part.

In some embodiments, the helical bearing arrangement comprises a plurality of tracks and a plurality of bearings that are each received in a respective track and, preferably, the helical bearing arrangement comprises three tracks.

In some embodiments, the helical bearing arrangement does not itself limit the range of helical movement of the second part relative to the first part.

In some embodiments, the tracks are spaced apart, and wherein the stops are substantially equidistant from the two nearest tracks.

In some embodiments, the tracks are substantially equally spaced apart.

In some embodiments, the tracks are disposed at first, second and third positions respectively about the helical axis and wherein the stops are located at a fourth position about the helical axis, and wherein the first, second, third and fourth positions are spaced at about 90 degrees intervals about the helical axis.

In some embodiments, the actuator assembly further comprises a loading arrangement, wherein the stops are disposed in closer proximity to the loading arrangement than to the helical bearing arrangement.

In some embodiments, the loading arrangement is a magnetic loading arrangement.

In some embodiments, at least a portion of the loading arrangement is fixed relative to (e.g. on) the protrusion.

In some embodiments, the protrusion comprises first and second surfaces, wherein the first surface comprises said other one of the first and second stops and wherein said portion of the loading arrangement is mounted to the second surface.

In some embodiments, the first and second surfaces face in generally opposite directions.

In some embodiments, the loading arrangement is configured to urge the second part relative to the first part in a direction generally perpendicular to the helical motion of the second part relative to the first part.

In some embodiments, the first direction is at an angle to the helical axis and, preferably, is substantially perpendicular to the helical axis.

In some embodiments, the first part comprises one or more further stops and the second part comprises one or more further stops each corresponding to the one or more further stops of the first part, wherein corresponding ones of the further stops are arranged so as to be spaced from each other throughout an operating range of said helical movement of the second part relative to the first part.

The further stops may have one or more of the features of the stops described above.

For example, in some embodiments, each further stop of the first part and corresponding further stop of the second part are spaced by a substantially constant distance in a further direction during at least a portion of said helical movement of the second part relative to the first part and are configured to engage if the further stop of the second part is moved relative to the further stop of the first part in said further direction.

In some embodiments, at least one of the one or more further directions is substantially parallel to the first direction.

In some embodiments, at least one of the one or more further directions is at an angle to the first direction and, preferably, is perpendicular to the first direction.

In some embodiments, the engagement of the stops restricts at least one degree of freedom of movement of the second part relative to the first part.

In some embodiments, the engagement of the stops restricts at least two degrees of freedom of movement of the second part relative to the first part and, preferably, three degrees of freedom.

In some embodiments, the stops and further stops together restrict at least two degrees of freedom of movement of the second part relative to the first part and, preferably, three, four, or five degrees of freedom of movement of the second part relative to the first part.

In some embodiments, the stops and further stops together restrict movement of the second part relative to the first part other than said helical movement of the second part relative to the first part.

In some embodiments, at least one of the one or more further directions is perpendicular to the helical axis.

In some embodiments, at least one of the one or more further directions is perpendicular to the direction of said helical movement, e.g. at the stops.

In some embodiments, the or each further stop of the first part comprises a first surface.

In some embodiments, the or each further stop of the second part comprises a second surface.

In some embodiments, the first surface of the or each further stop does not face in a direction that is normal to an axis parallel to the helical axis and/or the second surface of the or each further stop does not face in a direction that is normal to an axis parallel to the helical axis. In some embodiments, the first and/or second surface of the or each further stop is helically arranged.

In some embodiments, at least one of the further stops is arranged such that the corresponding further stops are spaced by the substantially constant further distance in the further direction over the entire range of said helical movement of the second part relative to the first part.

In some embodiments, at least one of the further stops is arranged such that the corresponding further stops are spaced by a substantially constant further distance in the further direction during a first portion of said helical movement of the second part relative to the first part.

In some embodiments, one of the first and second parts comprises a further track that comprises the further stop of said one of the first and second parts.

In some embodiments, the other one of the first and second parts comprises a further protrusion for being received in the further track, wherein the further protrusion comprises the stop of said other one of the first and second parts.

In some embodiments, one of the first and second parts comprises a plurality of such further tracks, each forming one of the further stops of said one of the first and second parts, and the other one of the first and second parts comprises a plurality of protrusions, each forming one of the further stops of said other one of the first and second parts.

In some embodiments, the substantially constant further distance is at least 50 microns and, preferably, is at least 75 microns, at least 100 microns, at least 125 microns or at least 150 microns. In some embodiments, the substantially constant further distance is less than 250 microns and, preferably, is less than 200 microns or less than 150 microns.

In some embodiments, the engagement of corresponding further stops restricts at least one degree of freedom of movement of the second part relative to the first part.

In some embodiments, the engagement of corresponding further stops restricts at least two degrees of freedom of movement of the second part relative to the first part and, preferably, three degrees of freedom.

The actuator assembly may have further, different stops that face in directions normal (and/or parallel) to the helical axis. However, such further stops are generally less effective at restricting relative movement of the first and second parts. For example, such further stops may only engage if a portion of the second part moves relative to the first part beyond a range of positions along (and/or away from) the helical axis defined by the normal movement envelope of the second part.

In some embodiments, the second part comprises first and second sides and an end stop that is arranged on one of the first and second sides and, preferably, wherein the first part comprises an end stop, and wherein the end stop of the second part moves towards or away from the end stop of the first part during helical movement of the second part relative to the first part.

In some embodiments, the end stop of the first part faces in a direction normal to an axis parallel to the helical axis. In some embodiments, the end stop of the second part faces in a direction normal to an axis parallel to the helical axis. The end stop of the first part may face in generally the opposite direction to the end stop of the second part.

In some embodiments, the first part comprises a support structure.

In some embodiments, the second part comprises a moveable mount and, preferably, a movable lens mount.

In some embodiments, the actuator assembly comprises a drive mechanism configured to drive rotation of the second part around the helical axis which the helical bearing arrangement converts into the helical movement of the second part.

In some embodiments, the drive mechanism is configured to move the second part relative to the first part throughout the operating range between extreme first and second positions.

In some embodiments, the actuator assembly is a shape memory alloy actuator.

According to another aspect of the present invention, there is provided an autofocus system comprising the actuator assembly according the first aspect of the present invention.

According to another aspect of the present invention, there is provided a camera system comprising: the actuator assembly of the first aspect of the present invention; an image sensor; and, a lens system, wherein the image sensor is mounted to one of the first part and the second part, and wherein the lens system is mounted to the other one of the first part and second part.

BRIEF DESCRIPTION OF THE DRAWINGS

Certain embodiments of the present invention will now be described, by way of example only, with reference to the accompanying drawings, in which.

DETAILED DESCRIPTION

Except where the context requires otherwise, the term "bearing" is used herein as follows. The term "bearing" is used herein to encompass the terms "sliding bearing", "plain bearing", "rolling bearing", "ball bearing", "roller bearing", an "air bearing" (where pressurised air floats the load) and "flexure". The term "bearing" is used herein to generally mean any element or combination of elements that functions to constrain motion to only the desired motion and reduce friction between moving parts. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. Such a rolling bearing element may be a compliant element, for example a sac filled with gas. In embodiments, the bearing may be provided on, or may comprise, non-linear bearing surfaces.

In some embodiments of the present techniques, more than one type of bearing element may be used in combination to provide the bearing functionality. Accordingly, the term "bearing" used herein includes any combination of, for example, plain bearings, ball bearings, roller bearings and flexures.

Figure 1:
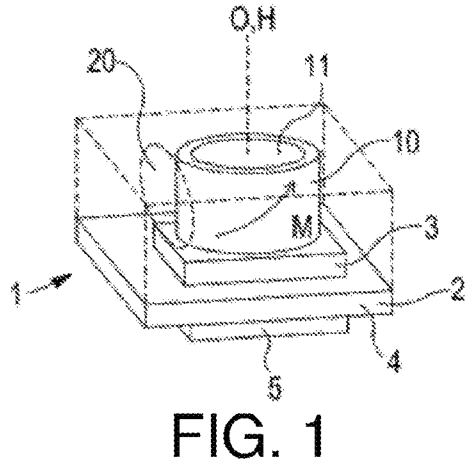
FIG. 1 is a schematic view of an SMA actuation apparatus that is a camera.

A shape memory alloy (SMA) actuation apparatus 1 that is a camera is shown schematically in FIG. 1.

The SMA actuation apparatus 1 comprises a support structure 2 that has an image sensor 3 mounted thereon. The support structure 2 may take any suitable form, typically including a base 4 to which the image sensor is fixed. The support structure 2 may also support an IC chip 5. The SMA actuation apparatus 1 also comprises a lens element 10 that is the movable element in this example. The lens element 10 comprises a lens 11, although it may alternatively comprise plural lenses. The lens element 10 has an optical axis O aligned with the image sensor 3 and is arranged to focus an image on the image sensor 3.

The SMA actuation apparatus 1 is a miniature device. In some examples of a miniature device, the lens 11 (or plural lenses, when provided) may have a diameter of at most 20 mm, preferably at most 15 mm, preferably at most 10 mm.

Although the SMA actuation apparatus 1 in this example is a camera, that is not in general essential. In some examples, the SMA actuation apparatus 1 may be an optical device in which the movable element is a lens element but there is no image sensor. In other examples, SMA actuation apparatus 1 may be a type of apparatus that is not an optical device, and in which the movable element is not a lens element and there is no image sensor. Examples include apparatuses for depth mapping, face recognition, game consoles, projectors and security scanners.

The SMA actuation apparatus 1 also comprises a helical bearing arrangement 20 (shown schematically in FIG. 1) that supports the lens element 10 on the support structure 2. The helical bearing arrangement 20 is arranged to guide helical movement of the lens element 10 with respect to the support structure 2 around a helical axis H. The helical axis H in this example is coincident with the optical axis O and the helical movement is shown in FIG. 1 by the arrow M. Preferably, the helical motion is along a right helix, that is a helix with constant radius, but in general any helix is possible. The pitch of the helix may be constant or vary along the helical motion. Preferably, the helical movement is generally only a small portion (less than one quarter) of a full turn of the helix.

The helical motion of the lens element 10 guided by the helical bearing arrangement 20 includes a component of translational movement along the helical axis H and rotational movement around the helical axis H. The translational movement along the helical axis H is the desired movement of the lens element 10, for example to change the focus of the image on the image sensor 3 and/or to change the magnification (zoom) of the image on the image sensor 3. The rotational movement around the helical axis H is in this example not needed for optical purposes, but is in general acceptable as rotation of the lens element 10 does not change the focus of the image on the image sensor 3.

The helical bearing arrangement 20 may take a variety of forms.

Figure 2:
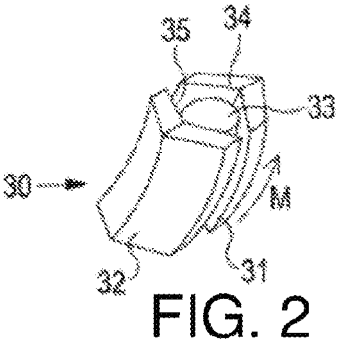
FIGS. 2 and 3 are perspective views of two helical bearings.
Figure 3:
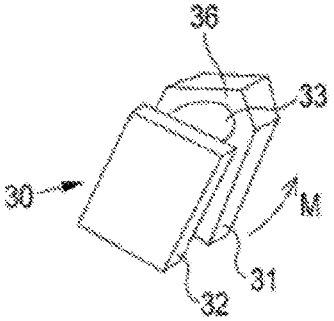

One possibility is that the helical bearing arrangement 20 comprises one or more helical bearings 30 that are rolling bearings, examples of which are shown in FIGS. 2 and 3. In each of FIGS. 2 and 3, the helical bearing 30 comprises a pair of bearing surfaces 31 and 32 and plural rolling bearing elements 33, for example balls, disposed between the bearing surfaces 31 and 32. One of the bearing surfaces 31 and 32 is provided on the support structure 2 and the other of the bearing surfaces 31 and 32 is provided on the lens element 10.

The helical bearing 30 guides the helical movement of the lens element 10 with respect to the support structure 2 as shown by the arrow M. This may be achieved by the bearing surfaces 31 and 32 extending helically around the helical axis H, that is following a line that is helical. In practical embodiments, the length of the bearing surfaces 31 and 32 may be short compared to the distance of the bearing surfaces 31 and 32 from the helical axis H, such that their shape is close to straight or even each being straight, provided that the one or more helical bearings of the helical bearing arrangement 20 guide helical movement of the lens element 10 with respect to the support structure 2. Plural helical bearings 30 are typically present, located at different angular positions around the helical axis H, in which case the helical bearings 30 have different orientations so that they cooperate and maintain adequate constraints to guide the helical movement of the lens element 10 with respect to the support structure 2, even if the bearing surfaces 31 and 32 of an individual helical bearing 30 are straight.

In the example of FIG. 2, the bearing surfaces 31 and 32 each comprise respective grooves 34 and 35 in which the rolling bearing elements 33 are seated. In this example, the grooves 34 and 35 constrain transverse translational movement of the lens element 10 with respect to the support structure 2, that is transverse to the direction of movement shown by arrow M. The grooves shown in FIG. 2 are V-shaped in cross-section, but other cross-sections are possible, for example curved as in portions of a circle or an oval. In general, the grooves 34 and 35 provide two points of contact with the respective rolling bearing elements 33. The grooves 34 and 35 may extend helically. Alternatively, in practical embodiments, the length of the bearing surfaces 31 and 32 may be short compared to the distance of the bearing surfaces 31 and 32 from the helical axis H, in which case the grooves 34 and 35 may be straight or close to straight, provided that the one or more helical bearings 30 of the helical bearing arrangement 20 guide helical movement of the lens element 10 with respect to the support structure 2.

In the example of FIG. 3, a first bearing surface 31 comprises a groove 36 in which the rolling bearing elements 33 are seated and a second bearing surface 32 wherein the bearing surface is 'planar'. The first bearing surface 31 comprising a groove 36 may be provided on either one of the support structure 2 and the lens element 10, with the second bearing surface 32 being provided on the other one of the support structure 2 and the lens element 10. In the example of FIG. 3, the helical bearing 30 does not constrain transverse translational movement of the lens element 10 with respect to the support structure 2, that is transverse to the direction of movement shown by arrow M. The bearing surface 32 is 'planar' in the sense that it is a surface which is not a groove and one which provides only a single point of contact with the ball. In other words, the bearing surface 32 is effectively planar across a scale of the width of the rolling bearing element 33, although be helical at a larger scale. For example, as pictured, the 'planar' surface is helical, being a line in cross section which twists helically along the movement direction, maintaining a single point of contact with the ball at any time. Alternatively and as mentioned above, in practical embodiments the length of the bearing surfaces 31 and 32 may be short, in which case the bearing surface 32 may be planar or close to planar, provided that the one or more helical bearings 30 of the helical bearing arrangement 20 guide helical movement of the lens element 10 with respect to the support structure 2.

A single rolling bearing element 33 is shown in FIGS. 2 and 3 by way of example, but in general may include any plural number of rolling bearing elements 33.

In some examples, the helical bearing 30 may include a single rolling bearing element 33. In that case, the helical bearing 30 by itself does not constrain the rotational movement of the lens element 10 with respect to the support structure 2 about the single rolling bearing element 33, that is around an axis transverse to the direction of movement shown by arrow M. However, this minimises the overall size of the helical bearing 30, and in particular the height of the helical bearing 30 projected along the helical axis H as it is only needed to accommodate the size of the rolling bearing element 33 and the relative travel of the bearing surfaces 31 and 32.

In other examples, the helical bearing 30 may include plural rolling bearing element 33. In that case, the helical bearing 30 constrains the rotational movement of the lens element 10 with respect to the support structure 2 about either one of the rolling bearing elements 33, that is around an axis transverse to the direction of movement shown by arrow M. However, compared to use of a single rolling bearing element 33, this increases the overall size of the helical bearing 30, and in particular the height of the helical bearing 30 projected along the helical axis H.

The helical bearing arrangement may in general comprise any number of helical bearings 30 with a configuration chosen to guide the helical movement of the lens element 10 with respect to the support structure 2 while constraining the movement of the lens element 10 with respect to the support structure 2 in other degrees of freedom. Many helical bearing arrangements may comprise plural helical bearings 30 and at least one which comprises plural rolling bearing elements 30.

Figure 4:
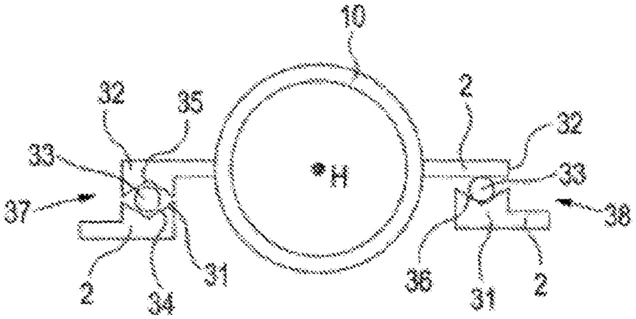
FIGS. 4 to 7 are schematic cross-sectional views of the SMA actuation apparatus with different possible helical bearing arrangements.
Figure 5:
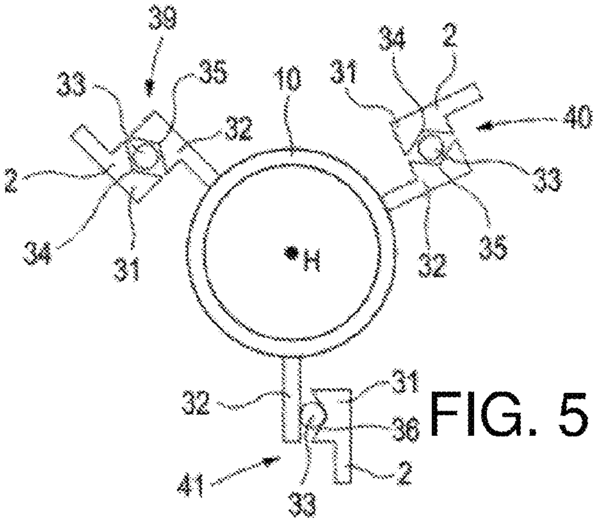
Figure 6:
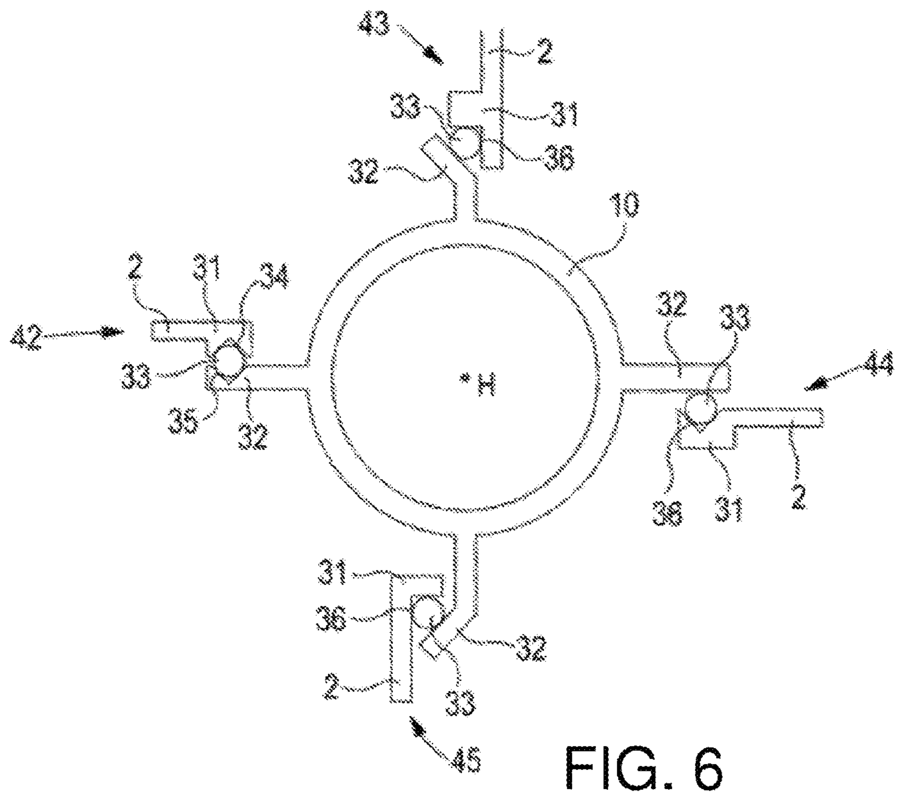

Some specific examples of the SMA actuation apparatus 1 with different possible helical bearing arrangements are illustrated in FIGS. 4 to 6 which are schematic plan views normal to the helical axis showing the support structure 2, the lens element 10 and the helical bearings 30.

FIG. 4 illustrates a possible helical bearing arrangement that includes two helical bearings 37 and 38 only. The helical bearings 37 and 38 are arranged on opposite sides of the lens element 2.

The first helical bearing 37 is of the same type as the helical bearing 30 shown in FIG. 2 wherein the bearing surfaces 31 and 32 each comprise respective grooves 34 and 35. The first helical bearing 37 includes plural rolling bearing elements 33 to constrain the relative movement of the lens element 10 and the support structure 2.

The second helical bearing 38 is of the same type as the helical bearing 30 shown in FIG. 3 wherein the first bearing surface 31 comprises a groove 36 in which the rolling bearing elements 33 are seated and the second bearing surface 32 is planar.

FIG. 4 illustrates the case that the first bearing surface 31 of the second helical bearing 38 is on the support structure 2, but it could alternatively be on the lens element 10. The second helical bearing 38 may comprise a single rolling bearing element 33 or plural rolling elements 33 and principally adds a constraint against relative rotation of the lens element 10 and the support structure 2 around the direction of movement (arrow M) of the first helical bearing 37.

The helical bearing arrangement of FIG. 4 includes a smaller number of helical bearings (i.e. two) than the other examples below, which simplifies the construction and reduces footprint of the SMA actuation apparatus 1.

FIG. 5 illustrates a possible helical bearing arrangement that includes three helical bearings 39, 40 and 41 only. The three helical bearings 39, 40 and 41 are equally angularly spaced around the helical axis H, but they could alternatively be spaced unequally.

The first and second helical bearings 39 and 40 are of the same type as the helical bearing 30 shown in FIG. 2 wherein the bearing surfaces 31 and 32 each comprise respective grooves 34 and 35. The third helical bearing 41 is of the same type as the helical bearing 30 shown in FIG. 3 wherein the first bearing surface 31 comprises a groove 36 in which the rolling bearing element 33 is seated and the second bearing surface 32 is planar. FIG. 5 illustrates the case that the first bearing surface 31 of the third helical bearing 41 is on the lens element 10, but it could alternatively be on the support structure 2.

Each of the three helical bearings 39, 40 and 41 may comprise a single rolling or plural bearing elements 33. This is possible because the constraints imposed by three helical bearings 39, 40 and 41, and in particular the grooves of the first and second helical bearings 39 and 40 sufficient to constrain the movement of the lens element 10 with respect to the support structure 2 in degrees of freedom other than the helical movement. As a result of using only a single rolling bearing element 33 in each of the three helical bearings 39, 40 and 41, the overall size of the three helical bearings 39, 40 and 41, and in particular the height of the three helical bearings 39, 40 and 41 projected along the helical axis H is reduced compared to the helical bearing arrangement of FIG. 4.

FIG. 6 illustrates a possible helical bearing arrangement that includes four helical bearings 42 to 45 only. The four helical bearings 42 to 45 are equally angularly spaced around the helical axis H.

The first helical bearing 42 is of the same type as the helical bearing 30 shown in FIG. 2 wherein the bearing surfaces 31 and 32 each comprise respective grooves 34 and 35.

The second, third and fourth helical bearings 43, 44 and 45 are each of the same type as the helical bearing 30 shown in FIG. 3 wherein the first bearing surface 31 comprises a groove 36 in which the rolling bearing element 33 is seated and the second bearing surface 32 is planar. FIG. 6 illustrates the case that the first bearing surface 31 of the second, third and fourth helical bearings 43, 44 and 45 is on the lens element 10, but it could alternatively be on the support structure 2.

Each of the second, third and fourth helical bearings 43, 44 and 45 may comprise a single rolling bearing element 33 while the first helical bearing 42 comprises two rolling bearing elements. This is possible because the constraints imposed by four helical bearings 42 to 45 are sufficient to constrain the movement of the lens element 10 with respect to the support structure 2 in degrees of freedom other than the helical movement.

Figure 7:
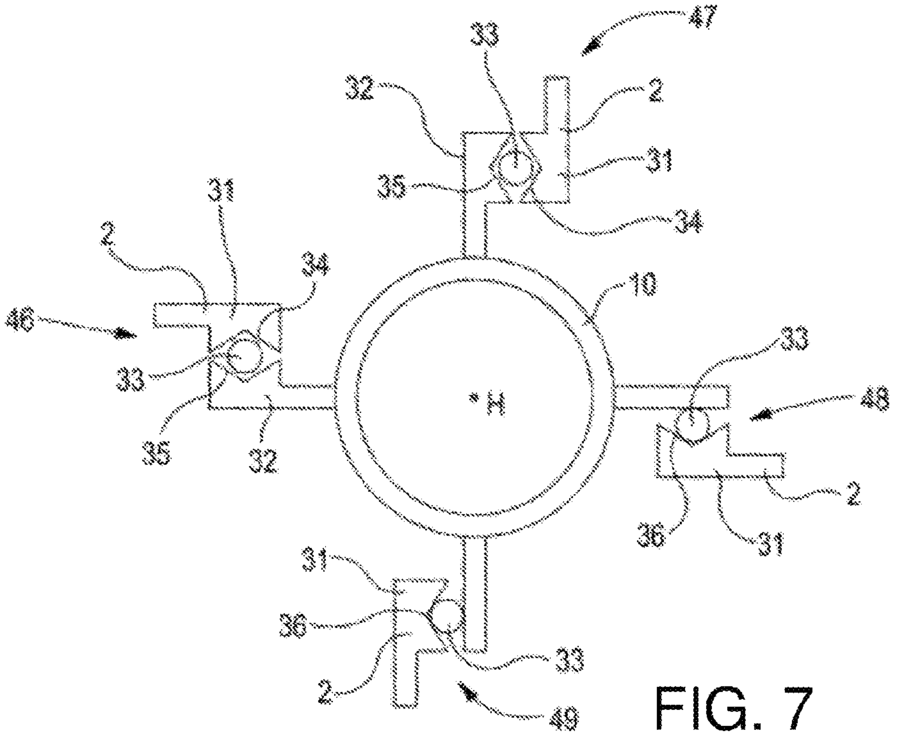

FIG. 7 illustrates another possible helical bearing arrangement that includes four helical bearings 46 to 49 only. The four helical bearings 46 to 49 are equally angularly spaced around the helical axis H, but they could alternatively be spaced unequally.

The first and second helical bearings 46 and 47 are of the same type as the helical bearing 30 shown in FIG. 2 wherein the bearing surfaces 31 and 32 each comprise respective grooves 34 and 35.

The third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 7 illustrates the case that the first bearing surface 31 of the third and fourth helical bearings 48 and 49 is on the lens element 10, but it could alternatively be on the support structure 2.

Each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. As a result of using only a single rolling bearing element 33 in each of the four helical bearings 46 to 49, the overall size of the four helical bearings 46 to 49, and in particular the height of the four helical bearings 46 to 49 projected along the helical axis H is reduced compared to the helical bearing arrangement of FIG. 4.

In each of the helical bearing arrangements of FIGS. 4 to 7, the bearing surfaces 32 which are on the lens element 10 are each arranged on the same side of (all above or all below) the bearing surfaces 31 on the support structure 2. As the bearing surfaces 31 and 32 extend helically, this means that in the view of FIG. 5 which is a cross-section perpendicular to the helical axis H, all the bearing surfaces 32 which are on the lens element 10 are on the right of the bearing surfaces 31 on the support structure 2 as viewed outwardly of the helical axis H, and in the view of FIGS. 6 and 7 all the bearing surfaces 32 which are on the lens element 10 are on the left of the bearing surfaces 31 on the support structure 2 as viewed outwardly of the helical axis H. As a result of this arrangement, the helical bearings all the bearing surfaces 31 on the support structure 2 face in the same direction as each other, which assists in manufacture of the bearing surfaces 31 by the same tool. For instance, in embodiments wherein the first and second parts are moulded, then the above arrangement reduces the amount of actions on a tool, namely the number of directions that the tool must move to be removed from the first/second part. Similarly, manufacturing advantages apply to the bearing surfaces 32 on the lens element 2 which also face in the same direction as each other.

As a result of this arrangement, all the helical bearings 30 need to be loaded in the same helical sense. The helical bearings 30 are loaded normal to their respective helical faces. Thus loading of the helical bearings 30 may be provided by applying a loading force along the helical axis H, a loading force around the helical axis H, or, preferably, a suitable combination thereof that minimises interaction between the loading force and the force applied by the at least one SMA actuator wire 60, e.g. by being perpendicular to the direction of helical movement. For example, this loading force may be applied by the loading arrangement 170 described below in connection with the actuator assembly 101.

Figure 8:
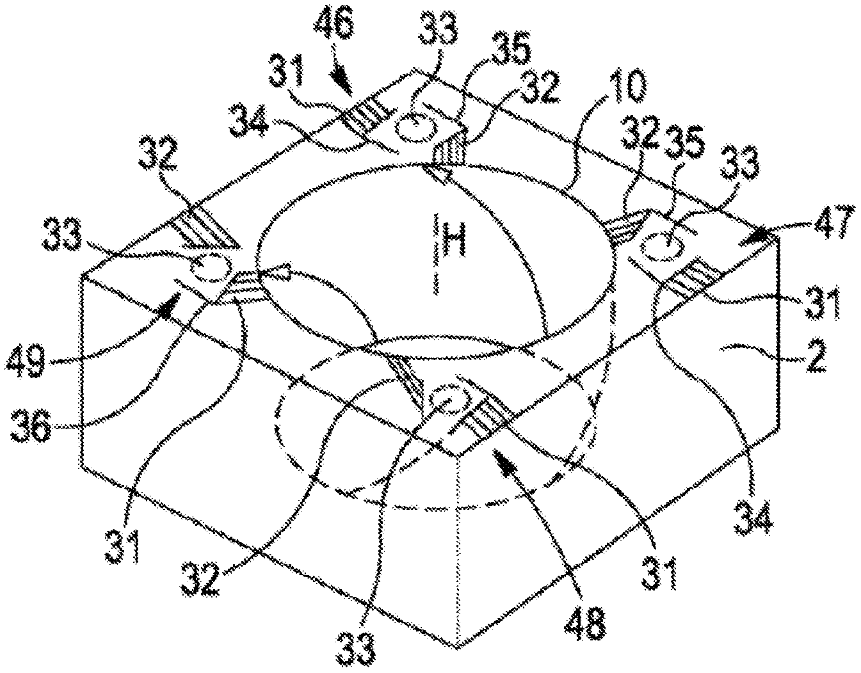
FIG. 8 is a perspective view of the SMA actuation apparatus with another possible helical bearing arrangement.

FIG. 8 illustrates another possible helical bearing arrangement that is a modification of the helical bearing arrangement of FIG. 7. Thus, the helical bearing arrangement includes four helical bearings 46 to 49 only, and the four helical bearings 46 to 49 are equally angularly spaced around the helical axis H, but they could alternatively be spaced unequally.

As in the helical bearing arrangement of FIG. 7, (a) the first and second helical bearings 46 and 47 are of the same type as the helical bearing 30 shown in FIG. 2 wherein the bearing surfaces 31 and 32 each comprise respective grooves 34 and 35, and (b) the third and fourth helical bearings 48 and 49 are of the same type as the helical bearing 30 shown in FIG. 3 wherein the first bearing surface 31 comprises a groove 36 in which the rolling bearing element 33 is seated and the second bearing surface 32 is planar. FIG. 8 illustrates the case that the first bearing surface 31 of the third and fourth helical bearings 48 and 49 is on the lens element 10, but it could alternatively be on the support structure 2. As in the helical bearing arrangement of FIG. 7, each of the four helical bearings 46 to 49 may comprise a single rolling bearing element 33. This is possible because the constraints imposed by four helical bearings 46 to 49 are sufficient to constrain the movement of the lens element 10 with respect to the support structure 2 in degrees of freedom other than the helical movement. In some embodiments, one of the bearings has a resilient element to load the other bearings, as described in WO2019/243849A1.

As a result of using only a single rolling bearing element 33 in each of the four helical bearings 46 to 49, the overall size of the four helical bearings 46 to 49, and in particular the height of the four helical bearings 46 to 49 projected along the optical axis is reduced when each of the helical bearings has a single rolling element only.

However, the helical bearing arrangement of FIG. 8 is modified compared to that of FIG. 7 to change the arrangement of the bearing surfaces 31 and 32 in the individual bearings 46 to 49, as follows. In the first helical bearing 46, the bearing surfaces 32 on the lens element 10 are above the bearing surfaces 31 on the support structure 2 as viewed along the helical axis H, whereas in the second helical bearing 47, the bearing surfaces 32 on the lens element 10 are below the bearing surfaces 31 on the support structure 2 as viewed along the helical axis H. Similarly, in the third helical bearing 48, the bearing surfaces 32 on the lens element 10 are above the bearing surfaces 31 on the support structure 2 as viewed along the helical axis H, whereas in the fourth helical bearing 49, the bearing surfaces 31 on the lens element 10 are below the bearing surfaces 32 on the support structure 2 as viewed along the helical axis H.

This may be understood on the following basis with reference to a constraint of the bearings in the vertical plane, parallel to the helical axis. The first and third helical bearings 46 and 48 constrain the lens element 10 from moving down, and the second and fourth helical bearings 47 and 49 constrain the lens element 10 from moving up, or rotating around an axis between first and third helical bearings 46 and 48.

Figure 9:
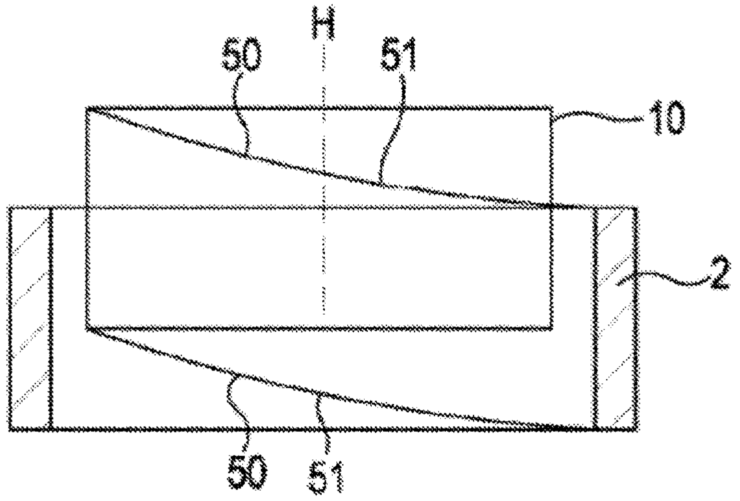
FIG. 9 is a side view of the SMA actuation apparatus with a helical bearing arrangement comprising plural flexures.
Figure 10:
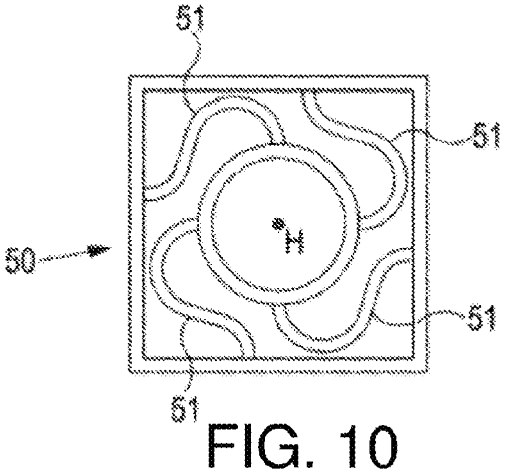
FIGS. 10 and 11 are plan views of the helical bearing arrangement of FIG. 9 with different forms of flexures.
Figure 11:
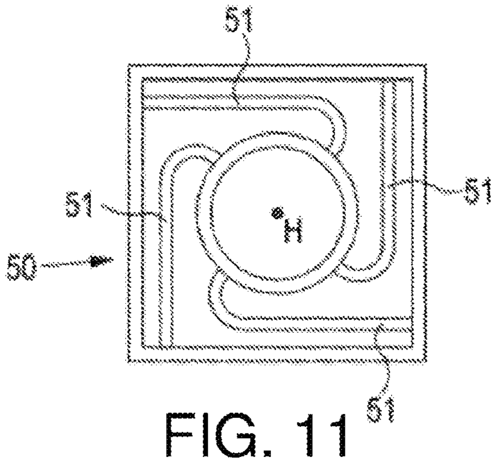

While the helical bearing arrangement 20 comprises helical bearings 30 that are rolling bearings in the above example, another possibility is that the helical bearing arrangement 20 comprises at least one flexure extending between the support structure 2 and the lens element 10 as shown for example in FIG. 9 wherein the helical bearing arrangement 20 comprises two flexure elements 50 that each comprise four flexures 51 having a configuration as shown either in FIG. 10 or in FIG. 11. As shown in FIG. 9, the flexures 51 are each pre-deflected along the helical axis H, and as shown in FIGS. 10 and 11, the flexures 51 each extend in an arc around the helical axis H. As a result of this configuration, the flexures 51 guide the helical movement of the lens element 10 with respect to the support structure 2 around the helical axis H. The specific number and arrangement of flexures 51 in FIGS. 9 to 11 is not essential and other configurations of flexures that are pre-deflected along the helical axis H and extend in an arc around the helical axis H may be used to provide the same function.

Figure 12:
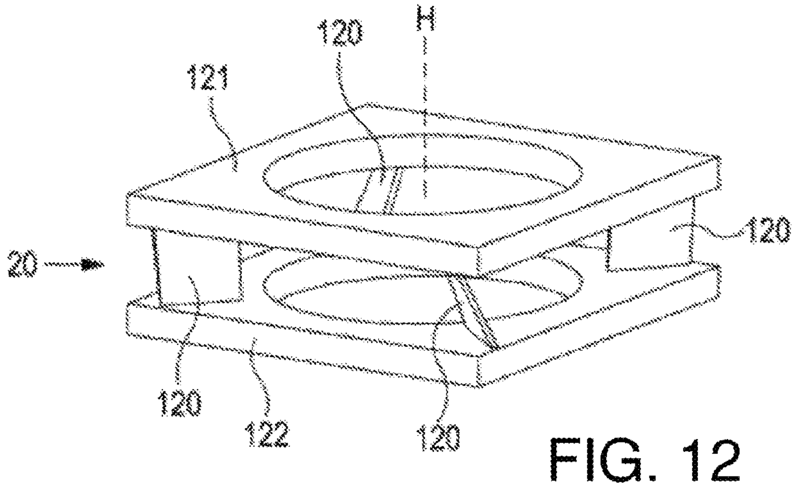
FIG. 12 is a perspective view of an alternative helical bearing arrangement comprising plural flexures.

FIG. 12 is a perspective view of an alternative helical bearing arrangement 20 comprising plural flexures 120, four flexures 120 being shown in FIG. 12 although in general any number of flexures 120 could be provided. In this example, the helical bearing arrangement also comprises a movable plate 121 mounted on lens element 10 and a support plate 122 mounted on the support structure 2. The movable plate 121 and the support plate 122 are spaced along the helical axis H and the flexures 120 extend along the helical axis H and are inclined with respect to a plane normal to the helical axis H helical axis with rotational symmetry around the helical axis H. With this arrangement, the flexures 120 guide the helical movement of the lens element 10 with respect to the support structure 2 around the helical axis H.

The flexures 120 are integrally formed with the movable plate 120 and the support plate 122. This form of connection is advantageous because it allows the helical bearing arrangement to be made as a single part, for example in a moulding, providing exact constraints. This solution therefore combines precision with a low manufacturing cost. That said, in principle the flexures 120 could be separate elements connected to the lens element 10 and the support structure 2 in any suitable way.

The use of one or more SMA actuator wires 60 to rotate the lens element 10 will now be described.

Figure 13:
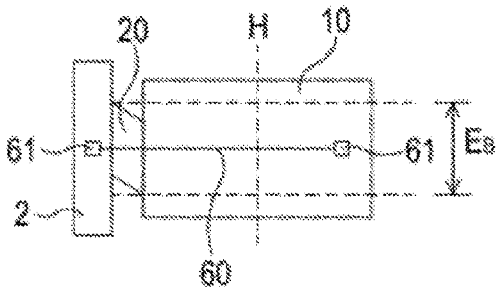
FIGS. 13 and 14 are schematic side views of the SMA actuator apparatus including an SMA actuator wire extending at two different angles.
Figure 14:
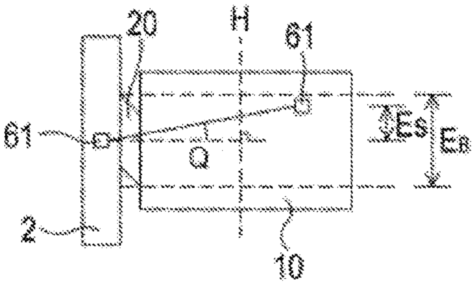

The SMA actuation apparatus 1 includes at least one SMA actuator wire 60 for the purpose of rotating the lens element 10. The or each SMA actuator wire 60 is connected between the support structure 2 and the lens element 10, for example as shown in FIGS. 13 and 14. The SMA actuator wire 60 is connected to the support structure 2 and lens element 10 by crimp portions 61 which crimp the SMA actuator wire 60 to provide both mechanical and electrical connection. In the case of FIG. 13, the SMA actuator wire 60 extends in a plane normal to the helical axis H. In the case of FIG. 14, the SMA actuator wire 60 extends at an acute angle Q to a plane normal the helical axis H. The SMA actuator wire 60 is offset from the helical axis. Thus, in both the case FIG. 13 and FIG. 14, contraction of the SMA actuator wire 60 drives rotation of the lens element 10 around the helical axis H. Accordingly, either of the orientations of the SMA actuator wire 60 of FIG. 13 or FIG. 14 may be used in any of the arrangements described below.

As the helical bearing arrangement 20 guides helical movement of the lens element 10 with respect to the support structure 2 and constrains movement in other degrees of freedom, the rotation driven by contraction of the SMA actuator wire 60 is converted by the helical bearing arrangement 20 into helical movement of the lens element 10 with respect to the support structure 2. Thus, as well as the component of rotational movement, a component of translational movement of the lens element 10 with respect to the support structure 2 is achieved along the helical axis H. This changes the focus of the image on the image sensor 3 as described above.

As the SMA actuator wire 60 has the primary purpose of driving rotation of the lens element 10, the extent of the SMA actuator wire projected along the helical axis H may be minimised. As such, other components of the SMA actuation apparatus 1 constrain the reduction in size along the helical axis H. Typically, the height projected along the helical axis H becomes dependent on the helical bearing arrangement 20, for example the geometry of the helical bearing arrangement 20. The helical bearing arrangement 20 is illustrated schematically in FIGS. 13 and 14.

Various different arrangements of the at least one SMA actuator wire 60 may be used in the SMA actuation apparatus 1, provided that the at least one SMA actuator wire 60 drives rotation of the lens element 10 with respect to the support structure 2. Some examples of possible arrangements of the at least one SMA actuator wire 60 are as follows with reference to FIGS. 15 and 16 which are each schematic drawings of the SMA actuation apparatus 1 including schematically illustrated connection portions 65 that are part of the lens element 10 and to which the SMA actuator wire 60 is connected. In each case, the or each SMA actuator wire 60 is connected between the support structure 2 and the lens element 10 in the respective orientations shown.

Figure 15:
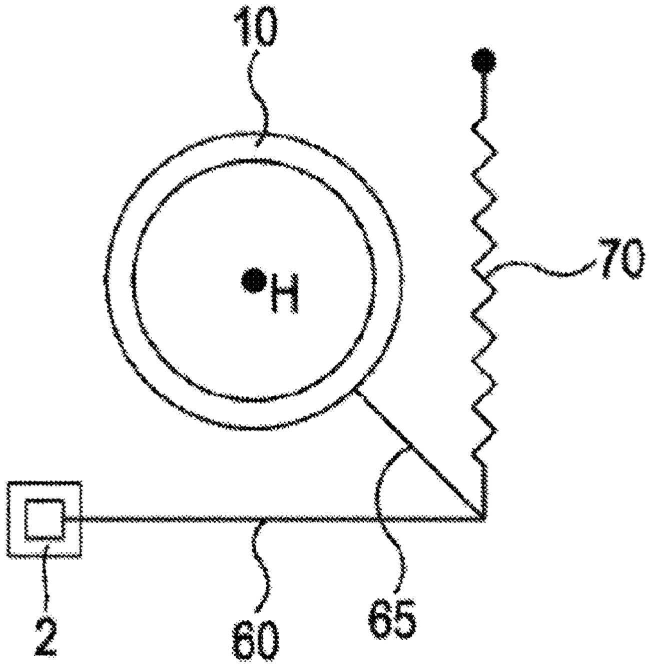
FIGS. 15 and 16 are schematic plan views of the SMA actuator apparatus with different arrangements of SMA actuator wire and a resilient biasing element.

In a first type of embodiment, the SMA actuation apparatus 1 further comprises a resilient biasing element 70 connected between the support structure 2 and the lens element 10, as in FIG. 15. The resilient biasing element 70 is typically a spring, as in the examples below, but in principle could be formed by any other element for example being a flexure or a piece of resilient material.

Such a resilient biasing element 70 is arranged to resiliently bias the at least one SMA actuator wire 60. In general terms, use of a resilient biasing element 70 with an SMA actuator wire is known, the resilient biasing element 70 applying a stress to the SMA actuator wire 60 and driving movement in the opposite direction from contraction of the SMA actuator wire 60. Thus, such a resilient biasing element 70 may be employed with a single SMA actuator wire 60 or plural SMA actuator wires 60. In the specific case of the SMA actuation 1, the resilient biasing element 70 may be arranged in various ways, some examples of which are as follows.

FIG. 15 shows an example where the SMA actuation apparatus 1 comprises a single SMA actuator wire 60 only and the resilient biasing element 70 extends around the helical axis H and so provides a force around the helical axis H. In FIG. 15, the resilient biasing element operates in tension, but alternatively could operate in compression, for example being arranged alongside the SMA actuator wire 60. The use of a resilient biasing element 70 extends around the helical axis H minimises the extent of the resilient biasing element 70 projected along the helical axis H.

Figure 16:
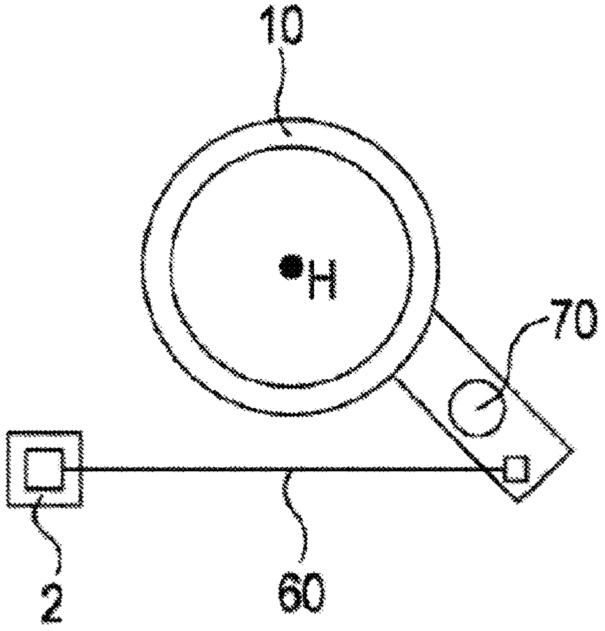
Figure 17:
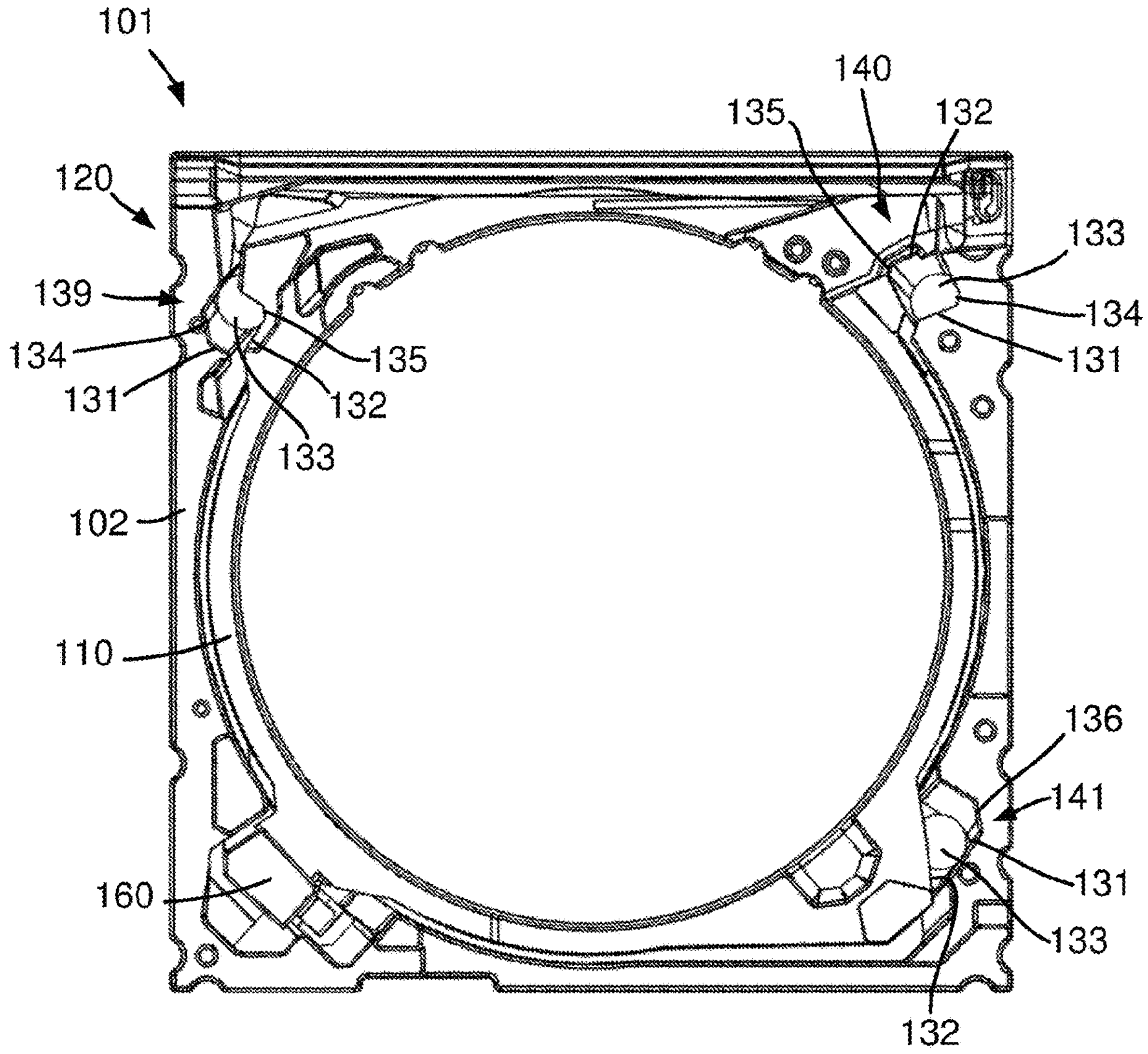
FIG. 17 is a plan view of a first embodiment of an actuator assembly.
Figure 18:
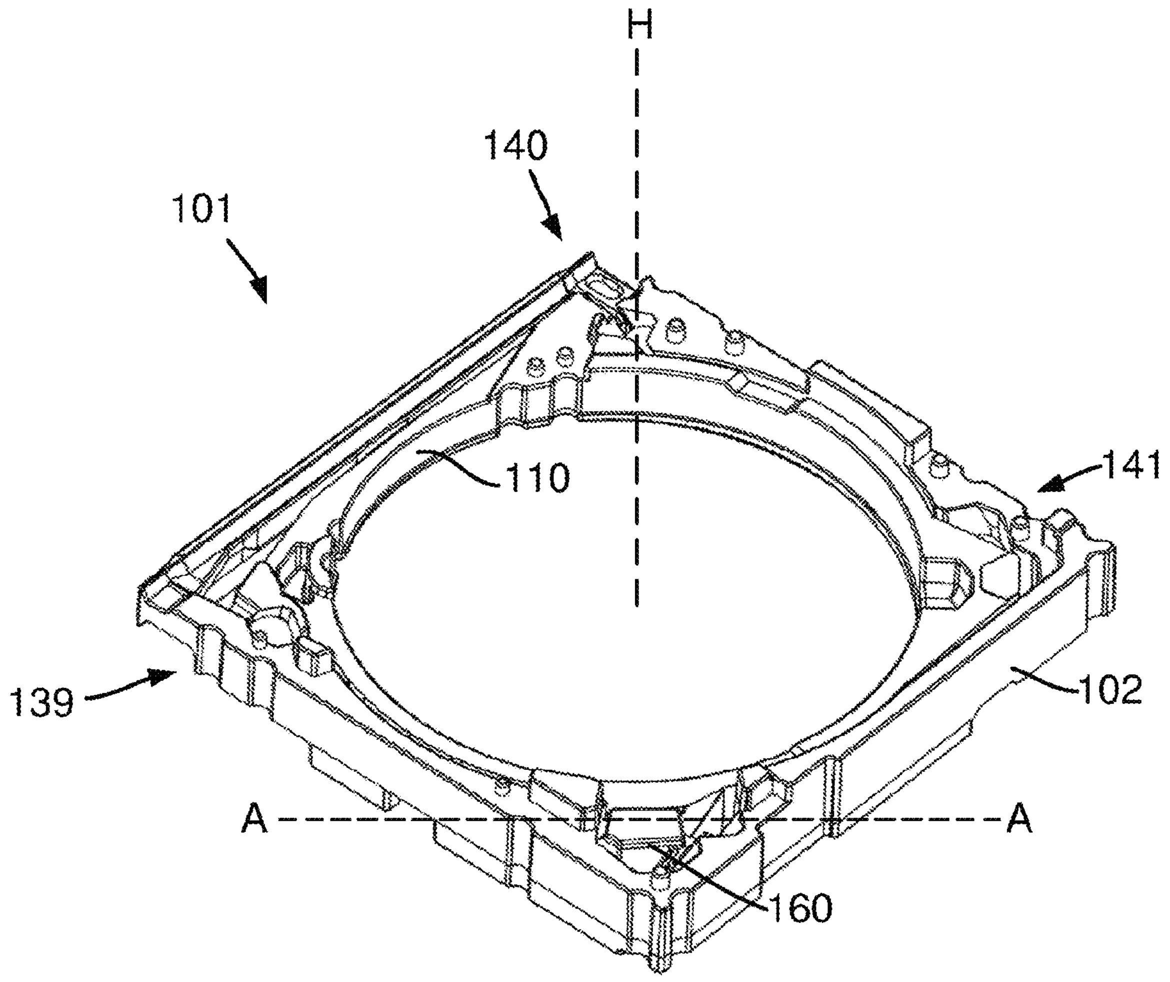
FIG. 18 is a perspective view of the actuator assembly of FIG. 17.
Figure 19:
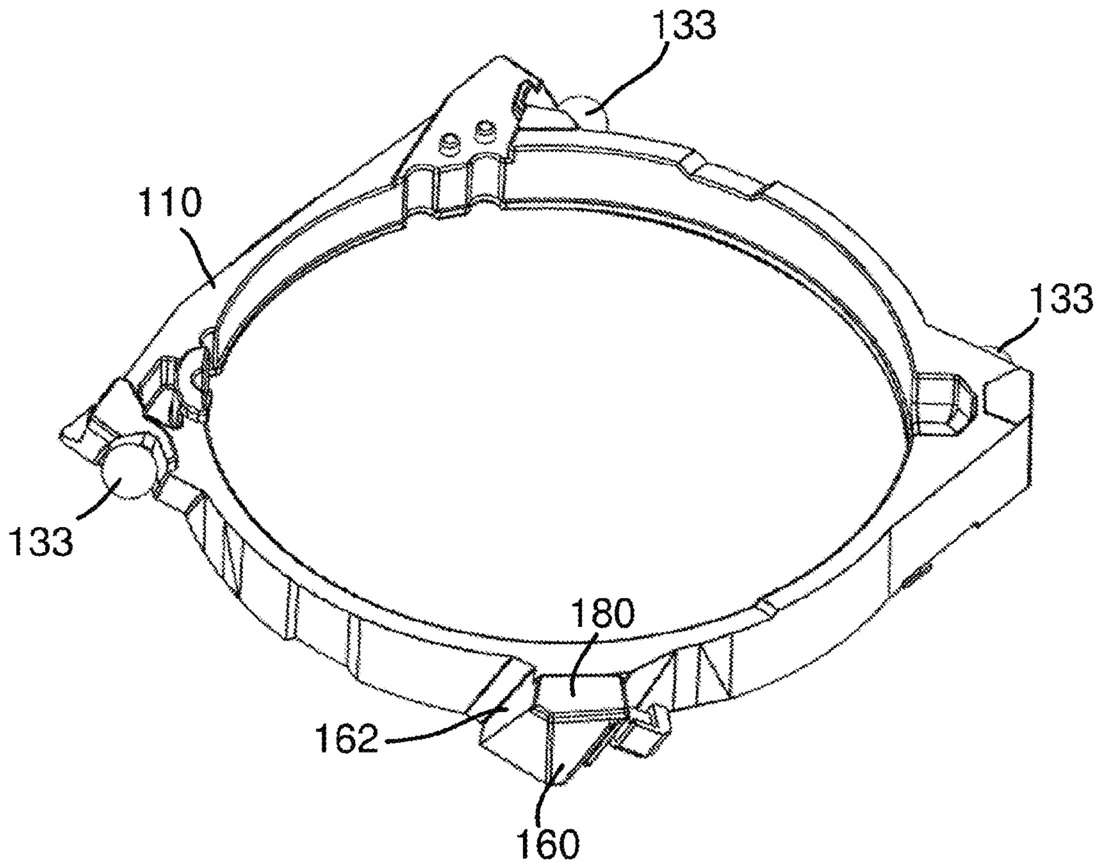
FIG. 19 is a perspective view of a moveable mount of the actuator assembly of FIG. 17.
Figure 20:
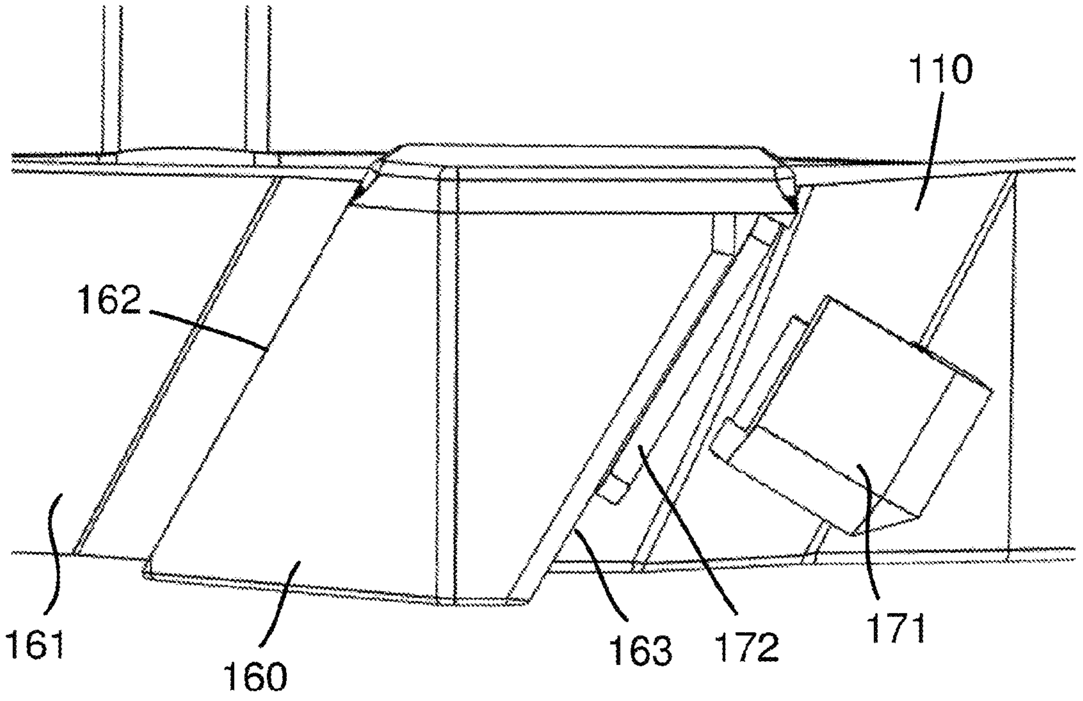
FIG. 20 is a close-up side view of a portion of the moveable mount of FIG. 19.
Figure 21:
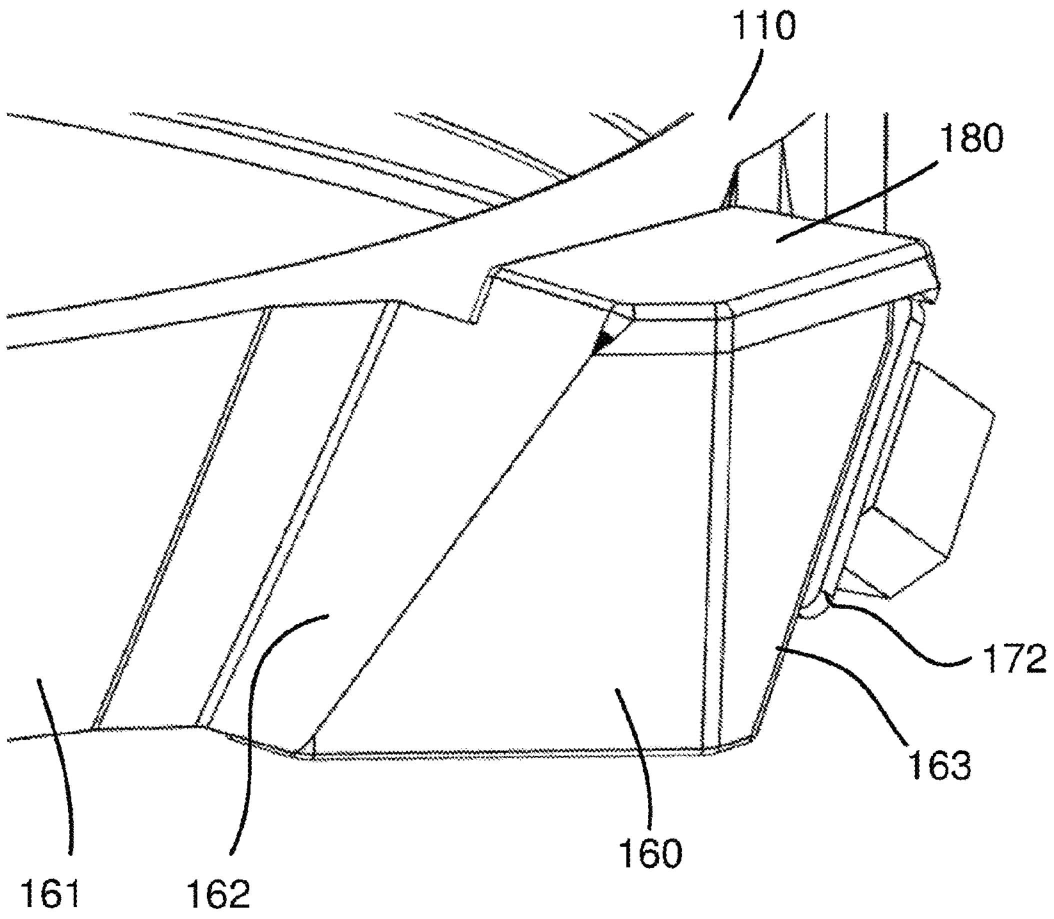
FIG. 21 is a close-up perspective view of a portion of the moveable mount of FIG. 19.
Figure 22:
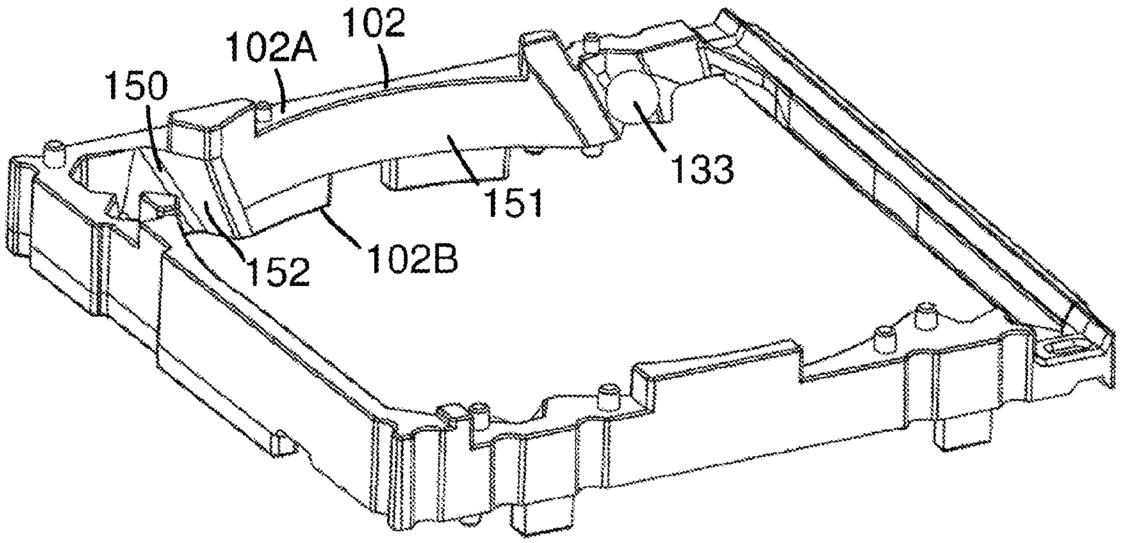
FIG. 22 is a perspective view of a support of the actuator assembly of FIG. 17.
Figure 23:
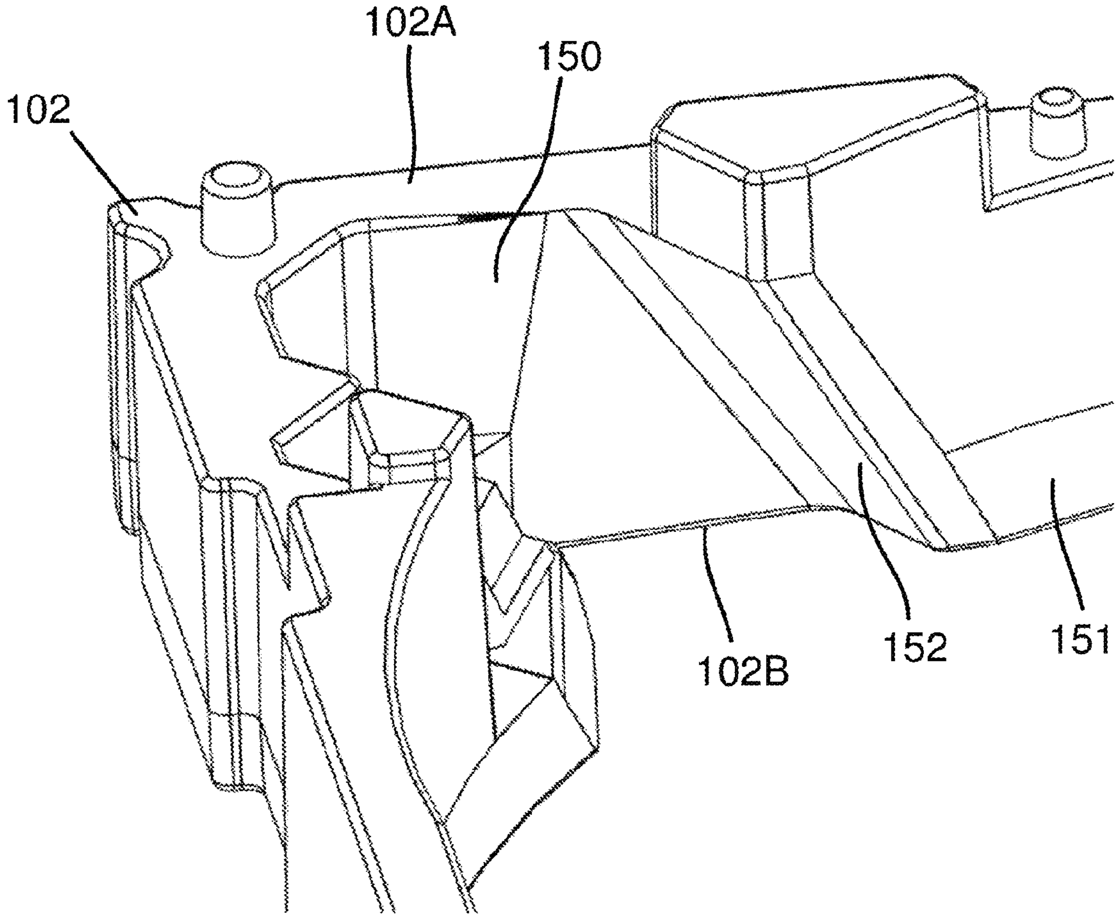
FIG. 23 is a close-up perspective view of a portion of the support of FIG. 22.
Figure 24:
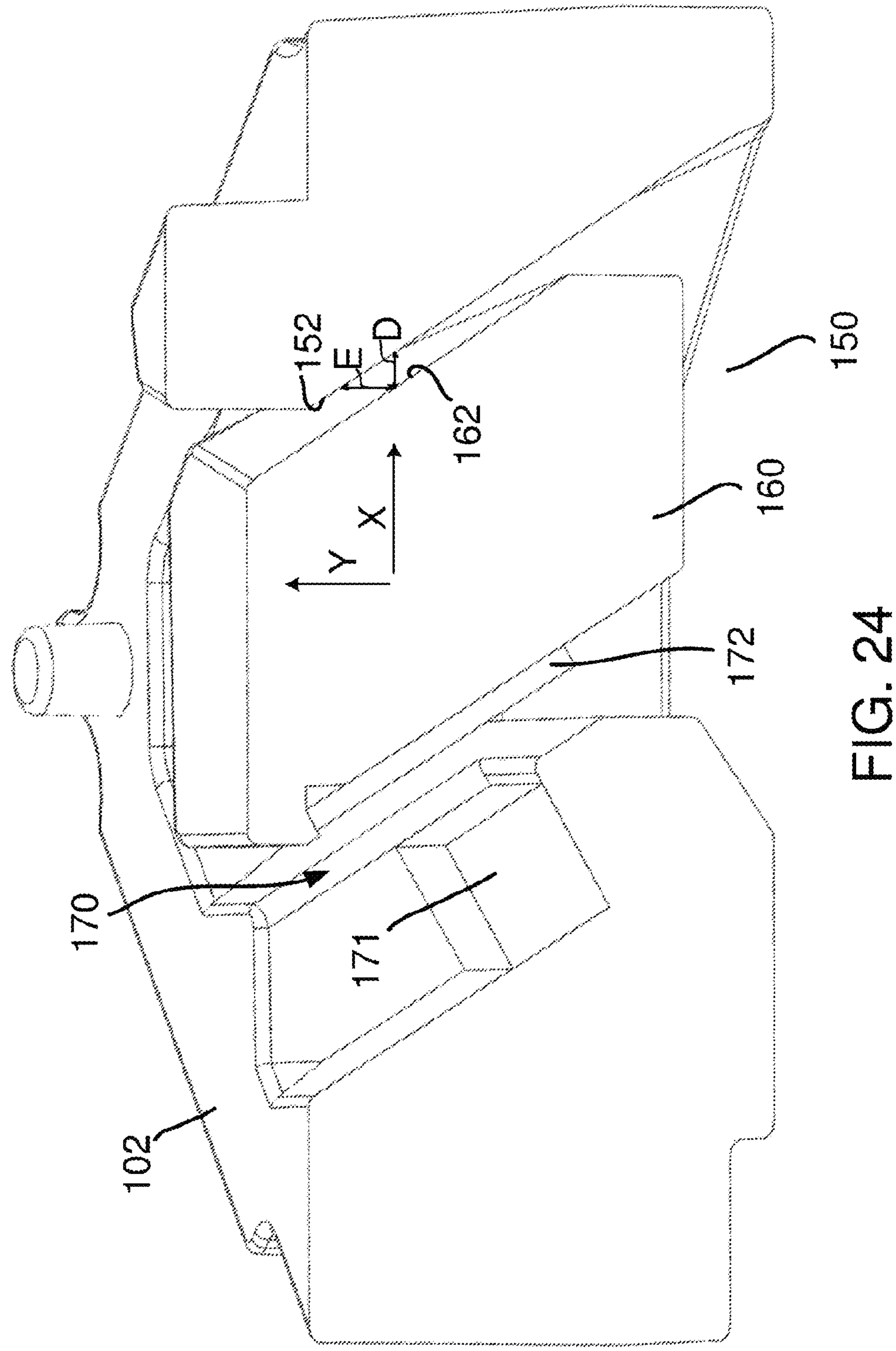
FIG. 24 is a cross-sectional view of the actuator assembly, along dashed line A-A shown in FIG. 18, showing a pair of stops spaced apart.

FIG. 16 shows an example where the SMA actuation apparatus 1 comprises a single SMA actuator wire 60 only and the resilient biasing element 70 extends parallel to the helical axis H and so provides a force along the helical axis H. In this case, the forces applied by the resilient biasing element 70 acts in a different direction from the SMA actuator wire 60, but resilient biasing is still provided due to the effect of the helical bearing arrangement 20. In FIG. 16, a helical spring is the resilient biasing element 70, shown with its axis parallel to the optic axis. The spring axis could alternatively be at an angle to the optic axis.

The examples shown in FIGS. 15 and 16 include a single SMA actuator wire 60, but may be modified to include plural SMA actuator wires 60 acting in parallel. For example, the SMA actuator wire 60 and the resilient biasing element 70 may be duplicated on opposite sides of the lens element 10. The SMA actuator wires 60 and the resilient biasing elements 70 have rotational symmetry around the helical axis, and so the SMA actuator wires 60 are complimentary and drive rotation of the lens element 10 with respect to the support structure 2 in parallel, that is in the same sense around the helical axis H, and so are actuated together. However, as the SMA actuator wires 60 are arranged on opposite sides of the helical axis H, the SMA actuator wires 60 also provide translational forces on the lens element 10 in opposite directions in a plane normal to the helical axis H. Thus, the net translational force applied by the SMA actuator wires 60 is minimised, thereby reducing the force applied to the helical bearing arrangement 20.

In another configuration, no resilient biasing element is provided, and instead the SMA actuation apparatus 1 comprises at least one pair of SMA actuator wires 60 that are arranged to drive rotation of the lens element 10 in opposite senses around the helical axis H. Similar to known uses of opposed SMA actuator wires to provide opposed forces in translation of an object that moves linearly, the or each pair of SMA actuator wires 60 apply opposed torques around the helical axis H. Thus, the SMA actuator wires 60 of the pair apply a stress to each other, which may act through the helical bearing arrangement 20, and drive rotation of the lens element 10 in the opposite directions around the helical axis H.

In general terms, any of the forms of the helical bearing arrangement 20 described herein, including any helical bearing arrangement or the flexure arrangement, may be used with any of the arrangements of at least one SMA actuator wire 60 described herein.

In all of the examples above, the SMA actuator wires 60 are driven by the control circuit implemented in the IC (Integrated Circuit) chip 5. In particular, the control circuit generates drive signals for each of the SMA actuator wires 60 and supplies the drive signals to the SMA actuator wires 60. The control circuit receives an input signal representing a desired position for the lens element 10 along the optical axis O and generates drive signals selected to drive the lens element 10 to the desired position. The drive signals may be generated using a resistance feedback control technique, in which case the control circuit 20 measures the resistance of the lengths of SMA actuator wire 20 and uses the measured resistance as a feedback signal to control the power of the drive signals. Such a resistance feedback control technique may be implemented as disclosed in any of WO-2013/175197; WO-2014/076463; WO-2012/066285; WO-2012/020212; WO-2011/104518; WO-2012/038703; WO-2010/089529 or WO-2010029316, each of which is incorporated herein by reference. As an alternative, the control circuit may include a sensor which senses the position of the lens element 10, for example a Hall sensor which sense the position of a magnet fixed to the lens element 10. In this case, the drive signals use the sensed position as a feedback signal to control the power of the drive signals.

Referring now to FIGS. 17 to 25, a first embodiment of an actuator assembly 101 is shown.

The actuator assembly 101 comprises a first part 102 and a second part 110. In the present embodiment, the first part 102 is a support structure 102 and the second part 110 is a moveable element 110, for example, a lens element 110. However, it should be recognised that the first and second parts 102, 110 may be other components. In one alternative embodiment (not shown), the first part is a moveable element and the second part is a support structure.

The actuator assembly 101 further comprises a helical bearing arrangement 120. The helical bearing arrangement 120 is arranged to guide helical movement of the second part 110 with respect to the first part 102 around a helical axis H. Thus, rotation of the second part 110 around the helical axis H is converted into helical movement of the second part 110. The helical bearing arrangement 120 may have the configuration of any of the examples described above in reference to FIGS. 1 to 16, or may have an alternate configuration.

In the present example, the helical bearing arrangement 120 has a similar arrangement to the helical bearing arrangement 20 shown in FIG. 5, comprising first, second and third helical bearings 139, 140, 141.

The first helical bearing 139 is spaced from the second helical bearing 140 in a first direction about the helical axis H and the third helical bearing 141 is spaced from the second helical bearing 141 in a second direction about the helical axis H. The first and third helical bearings 139, 141 may be substantially equally spaced from the second helical bearing 140.

The first and second helical bearings 139 and 140 are of the same type as the helical bearing 30 shown in FIG. 2. Each of the first and second helical bearings 139, 140 comprises first and second bearing surfaces 131 and 132. Each first bearing surface 131 comprises a groove 134 and each second bearing surface 132 comprises a groove 135.

The third helical bearing 141 is of the same type as the helical bearing 30 shown in FIG. 3. The third helical bearing 141 comprises a first bearing surface 131 comprising a groove 136 in which a rolling bearing element 133 is seated. The third helical bearing 141 further comprises a second bearing surface 132 that is planar. In the present example, the first bearing surface 131 of the third helical bearing 141 is on the second part 110, but it could alternatively be on the first part 102.

In the present example, each of the three helical bearings 139, 140, 141 comprises a single rolling bearing element 133. However, in an alternative embodiment (not shown), one, two, or all of the helical bearings comprises a plurality of rolling bearing elements.

The actuator assembly 101 further comprises a drive mechanism that is configured to drive rotation of the second part 110 relative to the first part 102 around the helical axis H, which the helical bearing arrangement 120 converts into the helical movement of the second part 110.

The drive mechanism may comprise an SMA actuator, such as an SMA wire, having the configuration of any of the examples described above in reference to FIGS. 1 to 16, or may comprise an SMA actuator with an alternate configuration. In yet further embodiments, the drive mechanism may be of a type other than an SMA actuator. For example, the drive mechanism may instead, or additionally, comprise an electric motor (not shown), such as a voice coil motor (VCM) that is configured to drive rotation of the second part 110 relative to the first part 102.

In the present example, the drive mechanism is an SMA actuator of the type shown in FIG. 15, comprising a single SMA actuator wire 60 and a resilient biasing element 70 for providing resilient biasing, with the resilient biasing element 70 extending around the helical axis H to load the helical bearings. Any other SMA wire arrangements and/or loading arrangements are also possible. In some embodiments, an electrical connection element (not shown) is mounted on the second part 110 to provide an electrical connection from the end of the SMA actuator wire 60 which is connected to the second part 110 to the first part 102. A detailed description of the operation of the SMA actuator will not be repeated hereinafter.

The first part 102 comprises a track 150 that extends into an inner surface 151 of the first part 102. The inner surface 151 faces generally towards the helical axis H. In the present example, the track 150 is a slot 150 in the first part 102.

The first part 102 has opposing first and second sides 102A, 102B, which in some embodiments are a top side 102A and bottom side 102B.

In some embodiments, the track 150 extends through the first part 102 from the first side 102A to the second side 102B. In other embodiments, the track 150 only extends part of the way between the first and second sides 102A, 102B.

The track 150 extends generally helically. The track 150 may extend generally coincident or parallel to the helical movement M of the second part 110 relative to the first part 102.

The track 150 comprises a first surface 152 that forms a stop 152. The first surface 152 is arranged generally parallel to the helical movement M of the second part 110 relative to the first part 102.

The second part 110 comprises a protrusion 160 that extends from an outer surface 161 of the second part 110. The outer surface 161 faces generally away from the helical axis H. In the present example, the protrusion 160 is a rib 160.

The second part 110 has opposing first and second sides 110A, 110B, which in some embodiments are a top side 110A and bottom side 110B.

In some embodiments, the protrusion 160 extends from the first side 110A to the second side 110B. In other embodiments, the protrusion 160 only extends part of the way between the first and second sides 110A, 110B.

The protrusion 160 extends generally helically. The protrusion 160 may extend generally coincident or parallel, to the helical movement M of the second part 110 relative to the first part 102.

The protrusion 160 comprises a first surface 162 that forms a stop 162. The first surface 162 is arranged generally parallel to the helical movement M of the second part 110 relative to the first part 102.

The protrusion 160 is configured to be received in the track 150 such that the first surface 152 of the track 150 faces towards the first surface 162 of the protrusion 160. During normal operation of the actuator assembly 101, the first surfaces 152, 162 are separated by a constant or substantially constant distance (shown by arrow 'D' in FIG. 24) in a first direction (shown by arrow 'X' in FIG. 24). Normal operation refers, for example, to movement driven by the drive mechanism.

The first surfaces 152, 162 are generally helically arranged such that, during normal operation of the actuator assembly 101, when the drive mechanism is operated such that the helical bearing arrangement 120 guides helical movement of the second part with respect to the first part about the helical axis (shown by dashed line 'H' in FIG. 18), the first surfaces 152, 162 are spaced by said substantially constant distance D in the first direction X. That is, as the second part 110 moves helically with respect to the first part 102, the first surfaces 152, 162 are arranged to permit said helical movement without the first surfaces 152, 162 engaging each other.

In some embodiments, the first surfaces 152, 162 are arranged such that there is a less than 50% deviation of the distance D between the first and second surfaces 152, 162 during helical motion of the second part about the helical axis.

In the present example, the first surfaces 152, 162, remain said substantially constant distance D in the first direction X over the entire, or substantially the entire, range of helical movement of the second part 110 relative to the first part 102. However, it should be recognised that in alternative embodiments the first surfaces 152, 162, remain said substantially constant distance D in the first direction X over only a portion of the range of helical movement of the second part 110 relative to the first part 102 and thereafter the distance D may, for example, increase.

In some embodiments, one or both of the first surfaces 152, 162 extend helically around the helical axis H, that is following a line that is helical. In practical embodiments, the length of the or each first surface 152, 162 may be short compared to the distance of the first surfaces 152, 162 from the helical axis H, such that their shape is close to straight or even each being straight, provided that one or more first surfaces 152, 162 is arranged such that the first surfaces 152, 162 are spaced by said substantially constant distance D in the first direction X during at least a portion of said helical movement of the second part 110 relative to the first part 102. It should be recognised that in some embodiments the first and/or second surface 152, 162 may comprise a plurality of planar portion that together form a generally helical arrangement.

In some embodiments, the substantially constant distance is at least 50 microns and, preferably, is at least 75 microns, at least, 100 microns, at least 125 microns or at least 150 microns.

In some embodiments, the substantially constant distance is less than 250 microns and, preferably, is less than 200 microns or less than 150 microns.

Figure 25:
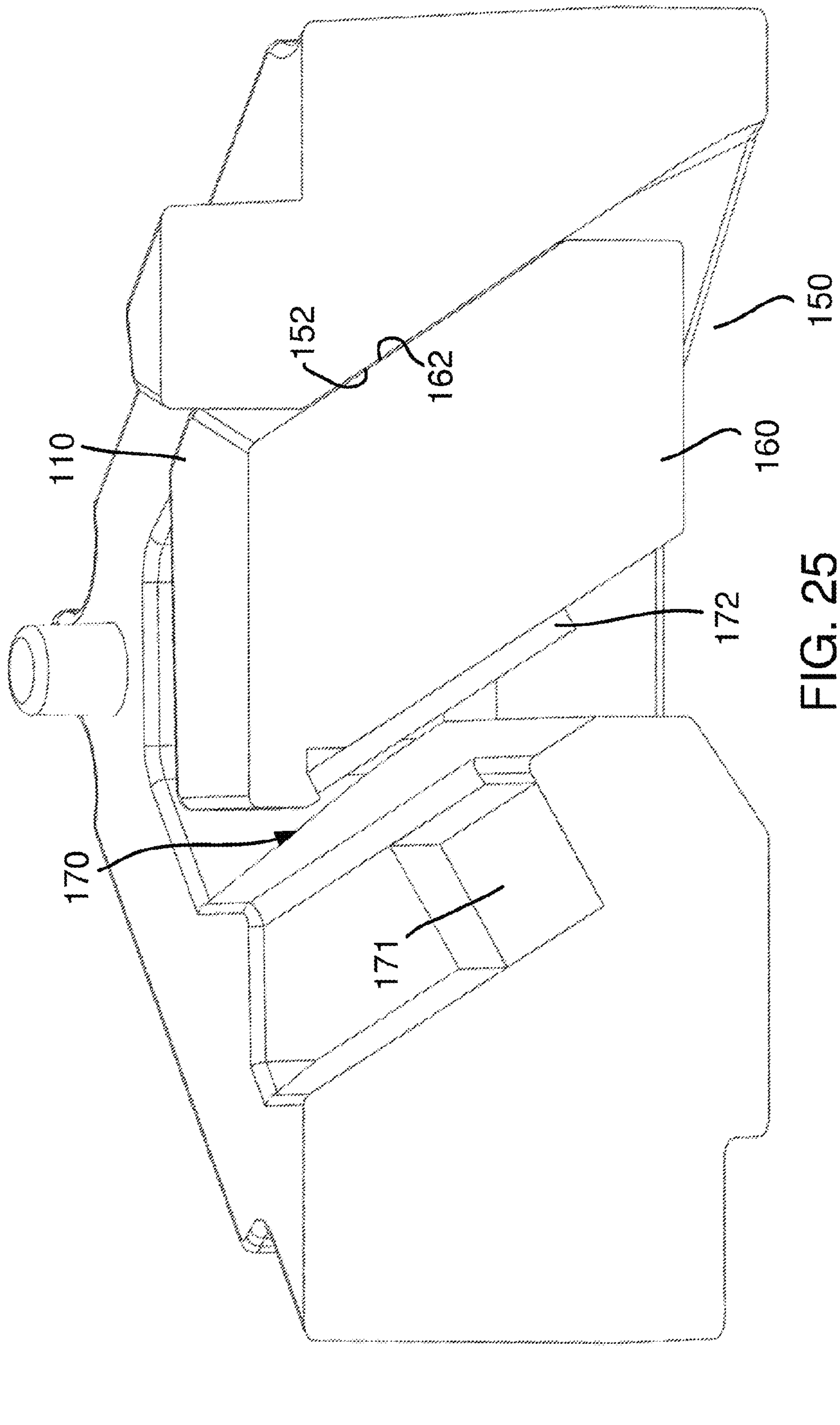
FIG. 25 is a cross-sectional view of the actuator assembly, along dashed line A-A shown in FIG. 18, showing the pair of stops engaging.

The first surfaces 152, 162 are configured to engage (as shown in FIG. 25) if the first surface 162 of the second part 110 is moved relative to the first surface 152 of the first part 102 by said distance D in the first direction X. The engagement of the first surfaces 152, 162 restricts relative movement of the first and second parts 102, 110.

Relative movement of the first surfaces 152, 162 that causes the first surfaces 151, 161 to engage may occur, for example, if the actuator assembly 101 is dropped. For instance, if the actuator assembly 101 is dropped, then upon impact with the ground or other object the first part 102 will deaccelerate quicker than the second part 110 thereby causing relative movement of the second part 110 relative to the first part 102. This movement of the second part 110 relative to the first part 102 may be in a direction generally perpendicular to the helical axis H such that portions of the first and second parts 102, 110 are pressed together, or components of the actuator assembly 101 are compressed between said portions of the first and second parts 102, 110, which may cause damage to the first and second parts 102, 106 and/or said components. Movement of the second part 110 relative to the first part 102 in a direction perpendicular to the helical axis H may also cause components of the actuator assembly 101 to be deformed, for example, stretched, which may damage said components. For instance, in embodiments wherein the drive mechanism comprises an SMA actuator wire, the actuator wire may be stretched, which may damage the actuator wire.

The arrangement of the stops 152, 162, which in the present embodiment are first surfaces 152, 162, helps to prevent damage to the actuator assembly 101. For example, if the actuator assembly 101 is dropped and the second part 110 is urged relative to the first part 102 in the first direction X, then the stops 152, 162 will engage to limit the amount of movement of the second part 110 relative to the first part 102. Once the first surface 162 of the second part 110 has moved said distance D towards the first part 102 in the first direction X, the first surfaces 152, 162 abut to resist further movement and thus help to prevent damage to the components of the actuator assembly 101. Since the stops 152, 162 are a substantially constant distance D over at least said portion of the helical movement of the second part 110 relative to the first part 102, the stops 152, 162 provide a reliable limit of the amount of movement of the second part 110 relative to the first part 102 regardless of the position of the second part 110 relative to the first part 102 within said portion of the helical movement.

In the present example, the first surfaces 152, 162 are also arranged such that, during normal operation of the actuator assembly 101, when the drive mechanism is operated such that the helical bearing arrangement 120 guides helical movement of the second part with respect to the first part about the helical axis (shown by dashed line 'H' in FIG. 18), the first surfaces 152, 162 are spaced by a substantially second constant distance E in a second direction Y. The second direction is different to the first direction X and, in some embodiments, the second direction Y is perpendicular to the first direction X. In the present example, the first surfaces 152, 162 are also configured to engage if the first surface 162 of the second part 110 is moved relative to the first surface 152 of the first part 102 by said second distance E in the second direction Y. Again, the engagement of the first surfaces 152, 162 restricts relative movement of the first and second parts 102, 110.

The distance D may be equal, or substantially equal, to the second distance E, or may be different.

In some embodiments, the engagement of the stops 152, 162 restricts at least one degree of freedom of movement of the second part 110 relative to the first part 102. In some embodiments, the engagement of the stops 152, 162 restricts at least two, three, four or five degrees of freedom of movement of the second part relative to the first part.

In some embodiments, the first and second parts 102, 110 each comprise a plurality of stops and wherein each stop of the first part 102 is configured to engage a corresponding stop of the second part 110. The stops together restrict movement of the second part 110 relative to the first part 102 in at least two, three, four or five degrees of freedom. For instance, if the second part 110 is moved relative to the first part 102 in a first direction then first stops of the first and second parts 102, 110 will engage to prevent further movement in the first direction, whilst if the second part 110 is moved relative to the first part 102 in a second direction then second stops of the first and second parts 102, 110 will engage to prevent further movement in the second direction. In some embodiments, the first direction is opposite to the second direction or is at an angle to the second direction, for example, perpendicular to the second direction. The first and second directions may both be perpendicular to the helical axis.

The first, second and third helical bearings 139, 140, 141 are spaced apart about the helical axis H. In some embodiments, the first, second and third helical bearings 139, 140, 141 are spaced at regular intervals about the helical axis H. The first, second and third bearings 139, 140, 141 may be ordered sequentially about the helical axis H.

In some embodiments, the stops 152, 162 are substantially equidistant from the two nearest helical bearings which, in the present example, is the first and third helical bearings 139, 141. The part of the second part 110 that is furthest from any of the bearings 139, 140, 141 has been found to have the most movement relative to the first part 102 if a non-helical movement of the second part 110 is induced, for example, if the actuator assembly 101 is dropped. Positioning the stops 152, 162 at this location of the most relative movement of the second part 110 relative to the first part 102 increases the effectiveness of the stops 152, 162 at reducing unwanted non-helical movement of the second part 110 relative to the first part 102.

In some embodiments, the first surface 152 of the first part 102 is substantially equally spaced to the groove 134 of the first bearing surface 131 of the first helical bearing 139 and the groove 136 of the first bearing surface 131 of the third helical bearing 141, in a plane normal to the helical axis H.

In some embodiments, the first surface 152 of the first part 102, the groove 134 of the first bearing surface 131 of the first helical bearing 139, the groove 134 of the first bearing surface 131 of the second helical bearing 140, and the groove 136 of the first bearing surface 131 of the third helical bearing 141 are substantially equally spaced about the helical axis H in a plane normal to the helical axis H. The first surface 152 of the first part 102, the groove 134 of the first bearing surface 131 of the first helical bearing 139, the groove 134 of the first bearing surface 131 of the second helical bearing 140, and the groove 136 of the first bearing surface 131 of the third helical bearing 141 may be spaced at substantially 90 degree intervals about the helical axis H in a plane normal to the helical axis H.

In some embodiments, the first surface 162 of the second part 110 is substantially equally spaced to the groove 135 of the second bearing surface 132 of the first helical bearing 139 and the first bearing surface 131 of the third helical bearing 141, in a plane normal to the helical axis H.

In some embodiments, the second surface 162 of the second part 110, the groove 135 of the second bearing surface 132 of the first helical bearing 139, the groove 135 of the second bearing surface 132 of the second helical bearing 140, and the second bearing surface 132 of the third helical bearing 141 are substantially equally spaced about the helical axis H in a plane normal to the helical axis H. The first surface 162 of the first part 102, the groove 135 of the second bearing surface 132 of the first helical bearing 139, the groove 135 of the second bearing surface 132 of the second helical bearing 140, and the second bearing surface 132 of the third helical bearing 141 may be spaced at substantially 90 degree intervals about the helical axis H in a plane normal to the helical axis H.

The actuator assembly 101 further comprises a loading arrangement 170 configured to load one or more of the first, second and third helical bearings 139, 140, 141. The loading arrangement 170 is configured to load the helical bearings 139, 140, 141. That is, the loading arrangement 170 is configured to load one or more of the helical bearings 139, 140, 141 in a direction normal to one or more of the bearing surfaces.

In the present example, the loading arrangement 170 is a magnetic loading arrangement 170. However, in other embodiments the loading arrangement 170 may be of a different configuration, for example, instead comprising a resilient element such as a spring to load the bearings 139, 140, 141.

The magnetic loading arrangement 170 comprises a first magnet 171 mounted to the first part 102 and a second magnet 172 mounted to the second part 110.

In the present example, the first and second magnets 171, 172 are configured to attract each other such that the portion of the second part 110 to which the second magnet 172 is mounted is urged towards the portion of the first part 102 to which the first magnet 171 is mounted, in order to load the helical bearings 139, 140, 141. However, in an alternate embodiment the first and second magnets 171, 172 are configured to repel each other such that the portion of the second part 110 to which the second magnet 172 is mounted is urged away from the portion of the first part 102 to which the first magnet 171 is mounted, in order to load the helical bearings 139, 140, 141.

In some embodiments, the first, second and third helical bearings 139, 140, 141 are arranged on three corners of the actuator assembly 101 and the stops 152, 162 are arranged on a fourth corner of the actuator assembly 101.

The first magnet 171 is provided at an edge of the track 150 or on a surface of the track 150. The second magnet 172 is mounted to the protrusion 160. In some embodiments, the protrusion 160 comprises a second surface 163 and the second magnet 172 is mounted to the second surface 163. The second surface 163 generally faces in the opposite direction to the first surface 162 of the protrusion 160 that forms the stop 162. In some embodiments, the first and second surfaces 162, 163 of the protrusion 160 face in generally opposite directions.

Advantageously, since a portion of the loading arrangement 170 is mounted to the same protrusion 160 that comprises the stop 162, the size, weight and complexity of manufacture of the actuator assembly 101 is reduced compared to embodiments (not shown) wherein said portion of the loading arrangement is mounted to a first protrusion and the stop 162 is provided on a separate second protrusion.

In one alternative embodiment, the magnetic loading arrangement 170 comprises a single magnet that is mounted to one of the first or second parts 102, 110. The other one of the first and second parts 102, 110 comprises a ferrous material, or has a portion of ferrous material attached thereto, arranged such that the magnet is attracted towards the ferrous material to load the bearings 139, 140, 141.

In some embodiments, the loading arrangement 170 is configured to urge the second part 110 relative to the first part 102 in a second direction that is generally opposite to the first direction.

In some embodiments, the stops 152, 162 are disposed in closer proximity to the loading arrangement 170 than to the helical bearing arrangement 120. That is, the stops 152, 162 are in closer proximity to the loading arrangement 170 than to any of the first, second or third helical bearings 139, 140, 141.

In the above described embodiment, the first part 102 comprises the first bearing surfaces 131 and the second part 110 comprises the second bearing surfaces 132. However, in an alternative embodiment, the second part 110 comprises the first bearing surfaces 131 and the first part 102 comprises the second bearing surfaces 132.

In the above described embodiment, the first part 102 comprises the track 150 and the second part 110 comprises the protrusion 160. However, in one alternative embodiment (not shown), the first part 102 comprises the protrusion and the second part 110 comprises the track that receives the protrusion.

In the above described embodiment, the stop 152 of the first part 102 comprises a surface 152 and the stop 162 of the second part 110 comprises a surface 162. However, in alternate embodiments, one or both of the stops 152, 162 may have a different configuration, for example, instead comprising an edge, ridge or protrusion. For example, an edge or ridge may extend generally helically to permit helical movement of the second part 110 relative to the first part 102.

In some embodiments, the second part 110 further comprises an end stop 180 that is arranged on one of the first and second sides 110A, 110B.

In some embodiments, the first part 102 comprises a corresponding end stop (not shown), wherein the end stop 180 of the second part 110 moves towards or away from the end stop of the first part 102 during helical movement of the second part 110 relative to the first part 102.

In some embodiments, the end stop (not shown) of the first part 102 faces in a direction normal to an axis parallel to the helical axis H. In some embodiments, the end stop 180 of the second part 11 faces in a direction normal to an axis parallel to the helical axis H. The end stop of the first part 102 may face in generally the opposite direction to the end stop 180 of the second part 110. The end stop of the first part 102 may be generally parallel to the end stop 180 of the second part 110.

The end stops of the first and second parts 102, 110 are configured to engage to limit rotation of the second part 110 relative to the first part 102, for example, rotation about an axis extending through bearing elements 133 of two of the first, second and third helical bearings 139, 140, 141. In the present example, the end stops of the first and second parts 102, 110 are configured to engage to limit rotation of the second part 110 relative to the first part 102 about an axis extending through bearing elements 133 of the first and third helical bearings 139, 141. That is, if the actuator assembly 100 is subjected to an impact that causes the second part 110 to rotate relative to the first part 102 about said axis extending through the bearing elements 133 of the first and third helical bearings 139, 141, the end stops will engage to prevent any further such rotation.

In some embodiments, the second part 110 comprises a further end stop (not shown) that is arranged on the other one of the first and second sides 110A, 110B. In some embodiments, the first part 102 comprises a corresponding further end stop (not shown). Again, the further end stops are configured to engage to limit rotation of the second part 110 relative to the first part 102, for example, rotation about an axis extending through bearing elements 133 of two of the first, second and third helical bearings 139, 140, 141.

Figure 26:
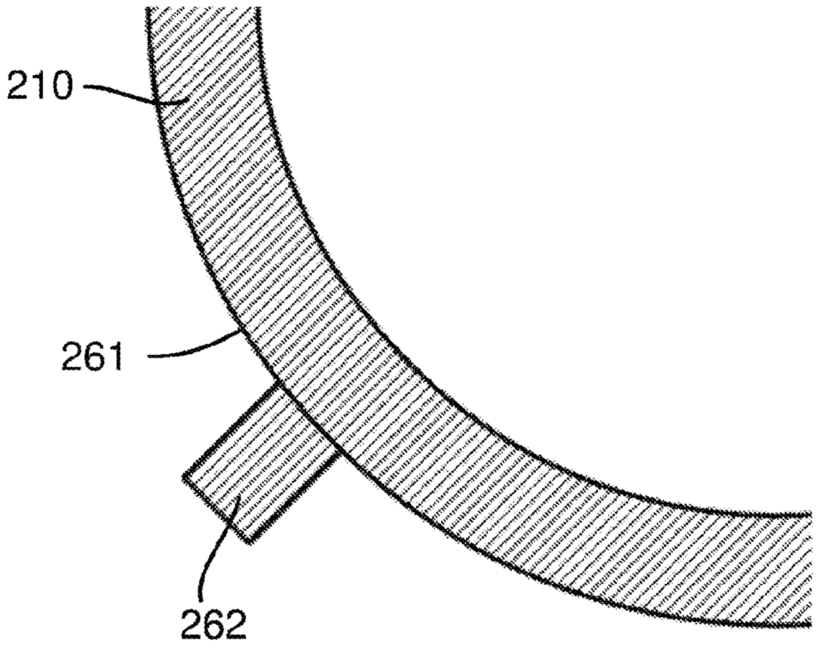
FIG. 26 is a schematic plan view of a portion of a moveable mount of an actuator assembly of a second embodiment.
Figure 27A:
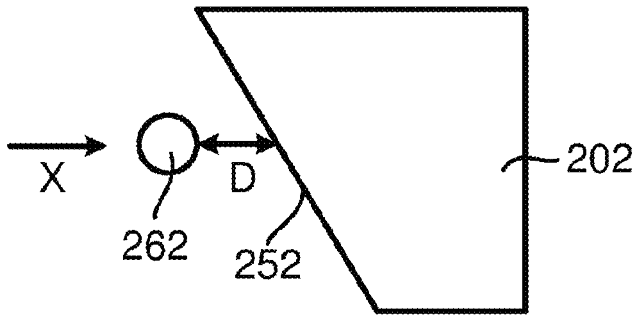
FIG. 27A is a schematic side view of a pair of stops of the actuator assembly of the second embodiment, wherein the stops are spaced apart.
Figure 27B:
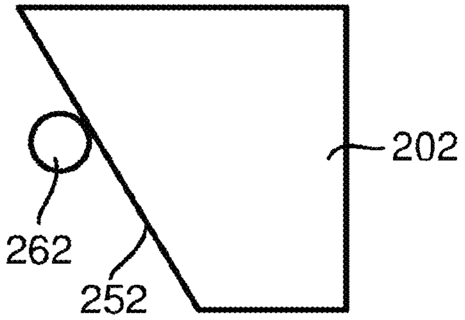
FIG. 27B is a schematic side view of a pair of stops of the actuator assembly of the second embodiment, wherein the stops engage.
Figure 28:
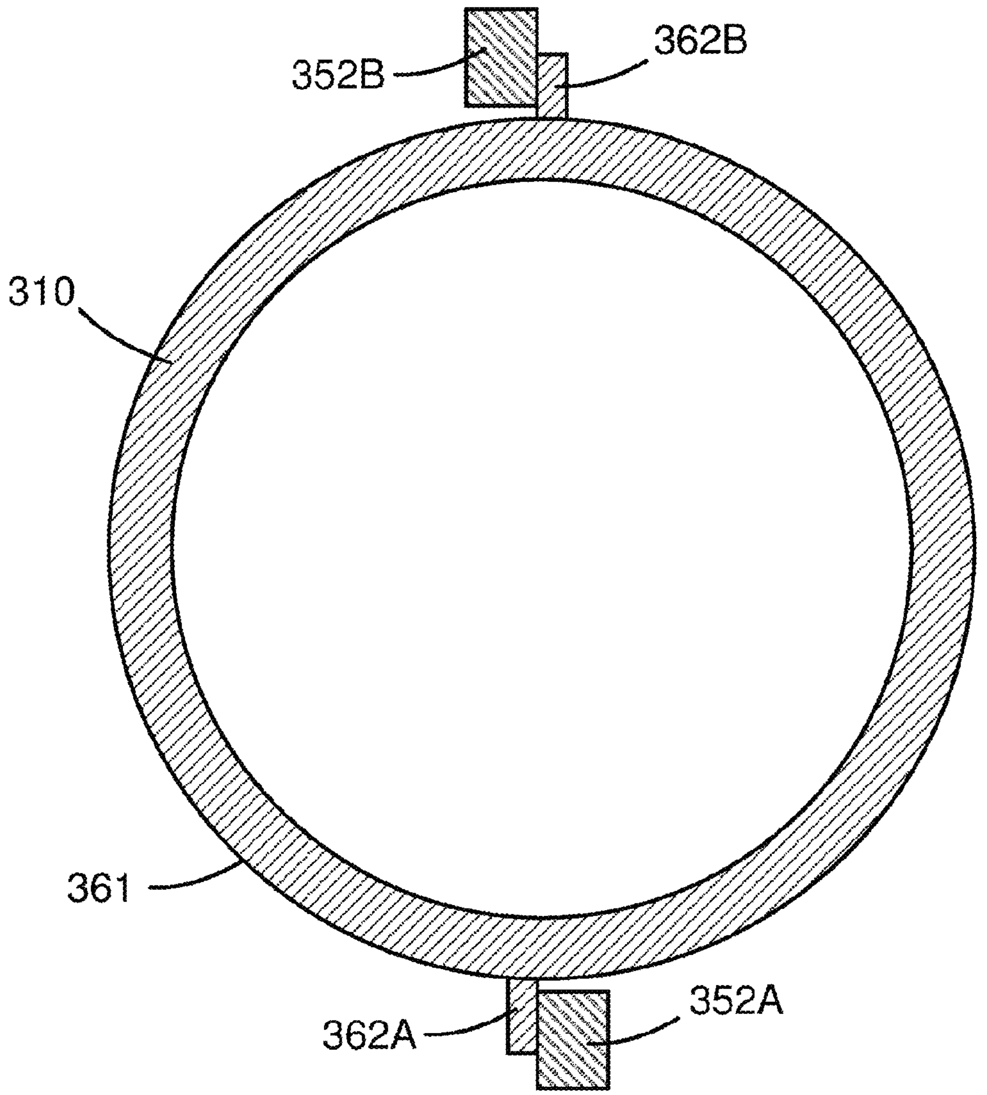
FIG. 28 is a schematic plan view of a moveable mount and pairs of first and second stops of an actuator assembly of a third embodiment.

Referring now to FIGS. 26 to 27B, components of an actuator assembly according to a second embodiment are shown. The actuator assembly of the second embodiment of FIGS. 26 to 27B is similar to that of the first embodiment of FIGS. 17 to 25 and thus a detailed description will not be repeated hereinafter. A difference is that the second part 210 of the actuator assembly of the second embodiment has a different arrangement of stop 262. More particularly, the stop 262 comprises a generally cylindrical protrusion 262 that extends radially outwardly from a circumferential outer surface 261 of the second part 210.

As with the first embodiment, the first part 202 comprises a first surface 252 that is generally helically arranged such that, during normal operation of the actuator assembly, when the drive mechanism is operated such that the helical bearing arrangement (not shown) guides helical movement of the second part 210 with respect to the first part 202 about the helical axis, the first surface 252 is spaced from the protrusion 262 by a substantially constant distance (shown by arrow 'D' in FIG. 27A) in the first direction (shown by arrow 'X' in FIG. 27A). That is, as the second part 210 moves helically with respect to the first part 202, the first surface 252 of the first part 202 is arranged to permit said helical movement without the protrusion 262 (or other configuration of stop in alternative embodiments) abutting the first surface 252.

In some embodiments, the stops 252, 262 are arranged such there is a less than 50% deviation of the distance D between the stops 252, 262 during helical motion of the second part about the helical axis.

In the present example, the stops 252, 262 remain a substantially constant distance D in the first direction X over the entire, or substantially the entire, range of helical movement of the second part 210 relative to the first part 202. However, it should be recognised that in alternative embodiments the stops 252, 262, remain said substantially constant distance D in the first direction X over only a portion of the range of helical movement of the second part 210 relative to the first part 202 and thereafter the distance D may, for example, increase.

In some embodiments, the first surface 252 of the first part 202 extends helically around the helical axis H, that is following a line that is helical. In practical embodiments, the length of the first surface 252 may be short compared to the distance of the first surface 252 from the helical axis H, such that the shape of the first surface 252 is close to straight or even being straight, provided that one or more first surfaces 252 is arranged such that the first surface(s) 252 is spaced by said substantially constant distance D in the first direction X during at least a portion of said helical movement of the second part 210 relative to the first part 202. In some embodiments, the first surface 252 comprises a plurality of planar portions that together form a generally helical arrangement.

The protrusion 262 is configured to engage the first surface 252 of the first part 202 (as shown in FIG. 27B) if the protrusion 262 is moved relative to the first surface 252 of the first part 202 by said distance D in the first direction X. The engagement of the protrusion 262 with the first surface 252 restricts relative movement of the first and second parts 202, 210. As explained above in respect of the first embodiment of the actuator assembly 101 shown in FIGS. 17 to 25, restricting relative movement of the first and second parts 202, 210 helps to prevent damage to the components of the actuator assembly, for example, if the actuator assembly is dropped or otherwise impacted.

In an alternative embodiment (not shown), the first part 202 comprises a generally cylindrical protrusion that extends radially inwardly from an inner surface of the first part 202, and the second part 210 comprises a first surface that is arranged such that the protrusion is spaced a substantially constant distance during helical movement of the second part 210 relative to the first part 210.

It should be recognised that the protrusion 262 may have any shape and does not need to be cylindrical. For instance, the protrusion 262 could instead have a square, triangular or rectangular cross-section. In some embodiments, the protrusion 262 is a rod.

Referring now to FIGS. 28 to 30D, components of an actuator assembly according to a third embodiment are shown. The actuator assembly of the third embodiment of FIGS. 28 to 30D is similar to that of the second embodiment of FIGS. 26 to 27B and thus a detailed description will not be repeated hereinafter. A difference is that the second part 310 of actuator assembly of the third embodiment comprises first and second stops 362A, 362B. Each stop 362A, 362B comprises a generally cylindrical protrusion 362A, 362B that extends radially outwardly from an outer surface 361 of the second part 310.

The first part (not shown) comprises first and second stops 352A, 352B. The first stop 352A of the first part is arranged in proximity to the first stop 362A of the second part 310 and the second stop 352B of the first part is arranged in proximity to the second stop 362B of the second part 310.

The first stop 352A of the first part comprises a first surface 352A of the first part and the second stop 352B of the first part comprises a second surface 352B of the first part.

The first surface 352A extends over a first distance (shown by arrow 'Y1' in FIGS. 29B and 30B) in the direction of the helical axis H, from the top side of the first part towards, but stopping short of, the bottom side of the first part. The second surface 352B extends over a second distance (shown by arrow 'Y2' in FIGS. 29B and 30B) in the direction of the helical axis, from the bottom side of the first part towards, but stopping short of, the top side of the first part.

When the second part 310 is moved relative to the first part over a first portion of helical movement, the first stop 362A is aligned with the first surface 352A in the direction along the helical axis.

Figure 29A:
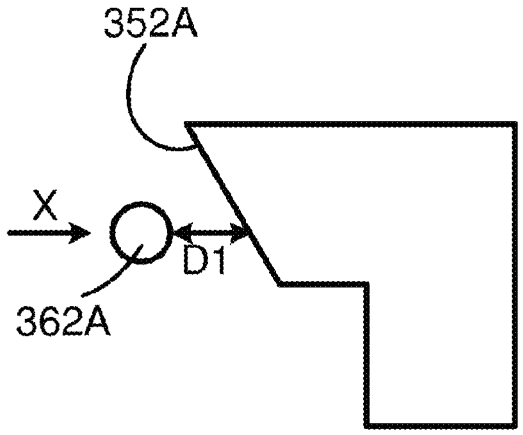
FIG. 29A is a schematic side view of the pair of first stops of the third embodiment, wherein the moveable mount is in a first axial position and the first stops are spaced apart.

The first surface 352A of the first part is generally helically arranged such that, during normal operation of the actuator assembly, when the drive mechanism is operated such that the helical bearing arrangement (not shown) guides helical movement of the second part 310 with respect to the first part about the helical axis over the first portion of the helical movement, the first stop 362A of the second part 310 is spaced from the first surface 352A by a substantially constant distance (shown by arrow 'D1' in FIG. 29A) in the first direction (shown by arrow 'X' in FIG. 29A). That is, as the second part 310 moves helically with respect to the first part over the first portion of helical movement, the first surface 352A of the first part is arranged to permit said helical movement without the first stop 362A of the second part 310 abutting the first surface 352A.

Figure 29B:
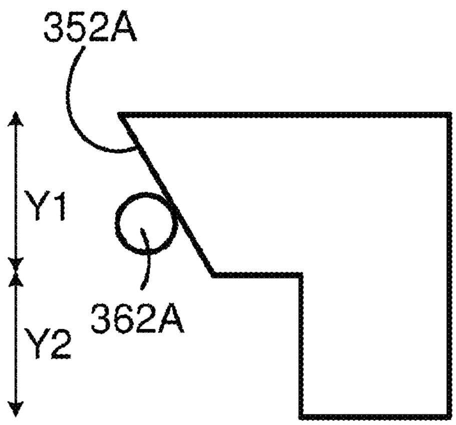
FIG. 29B is a schematic side view of the pair of first stops of the third embodiment, wherein the moveable mount is in a first axial position and the first stops are engaged.
Figure 29C:
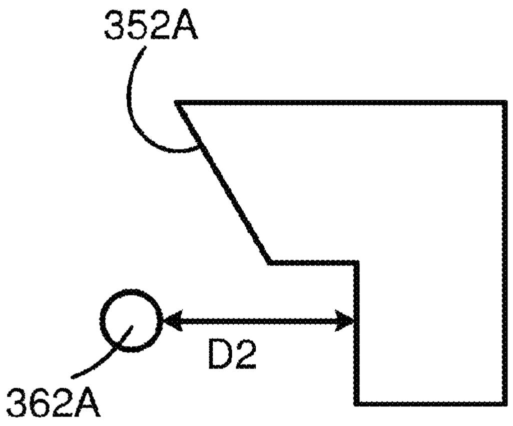
FIG. 29C is a schematic side view of the pair of first stops of the third embodiment, wherein the moveable mount is in a second axial position and the first stops are spaced apart.
Figure 29D:
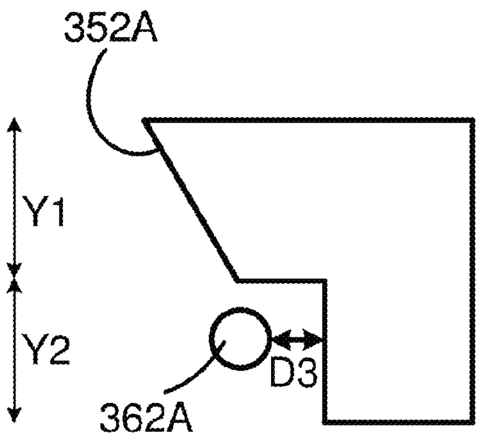
FIG. 29D is a schematic side view of the pair of first stops of the third embodiment, wherein the moveable mount is in a second axial position and the first stops are spaced apart.

The first stop 362A of the second part 310 is configured to engage the first surface 352A of the first part (as shown in FIG. 29B) if the first stop 362A is moved relative to the first surface 352A of the first part by said distance D1 in the first direction X. The engagement of the first stop 362A of the second part 310 with the first surface 352A restricts relative movement of the first and second parts. As explained above in respect of the first embodiment of the actuator assembly 101 shown in FIGS. 17 to 25, restricting relative movement of the first and second parts helps to prevent damage to the components of the actuator assembly, for example, if the actuator assembly is dropped or otherwise impacted.

When the second part 310 is moved relative to the first part over the first portion of helical movement, the second stop 362B of the second part 310 is not aligned with the second surface 352B along the helical axis and is instead spaced from the second part by a distance (depicted by arrow 'D2' in FIG. 30A) that may vary according to the position of the second part 310 along the first portion of helical movement, but is greater than said distance D1. Thus, movement of the second part 310 relative to the first part in the first direction X by the first distance D1 will result in the second stop 362B of the second part 310 still being spaced from the second part 310 by a distance (depicted by arrow 'D3' in FIG. 30B) that may vary according to the position of the second part 310 along the first portion of helical movement.

When the second part 310 is moved relative to the first part over a second portion of helical movement, the second stop 362B is aligned with the second surface 352B in the direction along the helical axis. The second surface 352B of the first part is generally helically arranged such that, during normal operation of the actuator assembly, when the drive mechanism is operated such that the helical bearing arrangement (not shown) guides helical movement of the second part 310 with respect to the first part about the helical axis over the second portion of the helical movement, the second stop 362B of the second part 310 is spaced from the second surface 352B by a substantially constant distance (shown by arrow 'D1' in FIG. 30C) in the first direction (shown by arrow 'X' in FIG. 30C). That is, as the second part 310 moves helically with respect to the first part over the second portion of helical movement, the second surface 352B of the first part is arranged to permit said helical movement without the second stop 362B of the second part 310 abutting the second surface 352B.

Figure 30A:
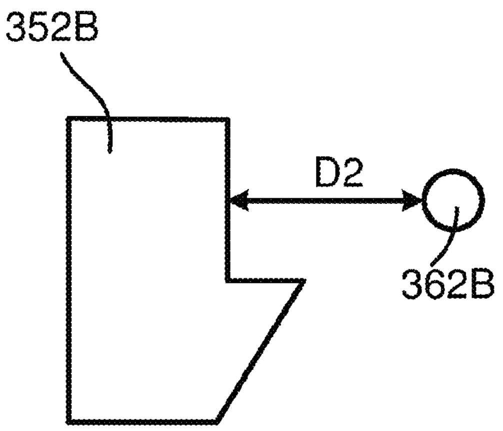
FIG. 30A is a schematic side view of the pair of second stops of the third embodiment, wherein the moveable mount is in a first axial position and the second stops are spaced apart.
Figure 30B:
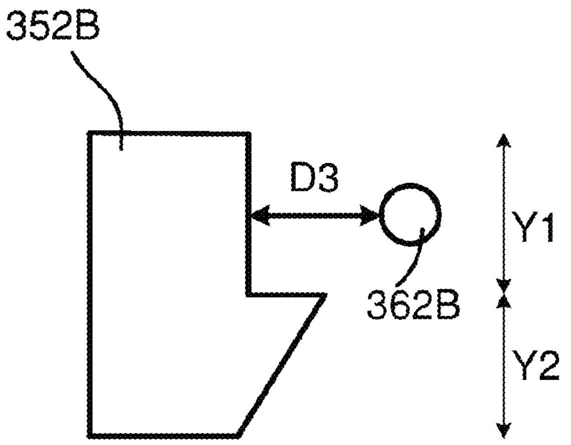
FIG. 30B is a schematic side view of the pair of second stops of the third embodiment, wherein the moveable mount is in a first axial position and the second stops are spaced apart.
Figure 30C:
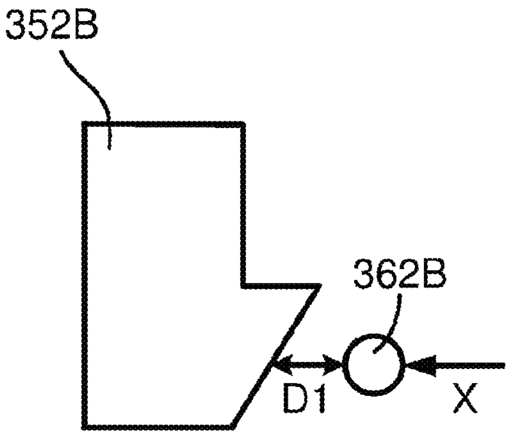
FIG. 30C is a schematic side view of the pair of second stops of the third embodiment, wherein the moveable mount is in a second axial position and the second stops are spaced apart; and, FIG. 30D is a schematic side view of the pair of second stops of the third embodiment, wherein the moveable mount is in a second axial position and the second stops are engaged.
Figure 30D:
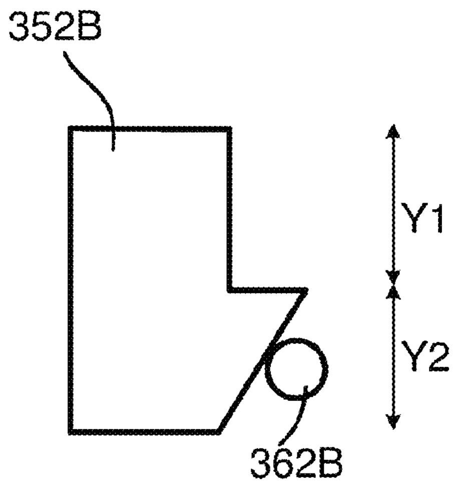

The second stop 362B of the second part 310 is configured to engage the second surface 352B of the first part (as shown in FIG. 30D) if the second stop 362B is moved relative to the second surface 352B of the first part by said distance D1 in the first direction X. The engagement of the second stop 362B of the second part 310 with the second surface 352B restricts relative movement of the first and second parts. As explained above in respect of the first embodiment of the actuator assembly 101 shown in FIGS. 17 to 25, restricting relative movement of the first and second parts helps to prevent damage to the components of the actuator assembly, for example, if the actuator assembly is dropped or otherwise impacted.

When the second part 310 is moved relative to the first part over the second portion of helical movement, the first stop 362A of the second part 310 is not aligned with the first surface 352A along the helical axis and is instead spaced from the second part by a distance (depicted by arrow 'D2' in FIG. 29C) that may vary according to the position of the second part 310 along the first portion of helical movement, but is greater than said distance D1. Thus, movement of the second part 310 relative to the first part in the first direction X by the first distance D1 will result in the first stop 362A of the second part 310 still being spaced from the second part by a distance (depicted by arrow 'D3' in FIG. 29D) that may vary according to the position of the second part 310 along the first portion of helical movement.

The first and second stops 352A, 362A, 352B, 362B therefore permit helical movement of the second part 310 relative to the first part, and together provide a stopping function over the entire range of helical movement of the second part.

The actuator assembly may be any type of assembly that comprises a first part and a second part movable with respect to the first part. The actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device (including domestic appliances such as vacuum cleaners, washing machines and lawnmowers), a mobile or portable computing device, a mobile or portable electronic device, a laptop, a tablet computing device, an e-reader (also known as an e-book reader or e-book device), a computing accessory or computing peripheral device (e.g. mouse, keyboard, headphones, earphones, earbuds, etc.), an audio device (e.g. headphones, headset, earphones, etc.), a security system, a gaming system, a gaming accessory (e.g. controller, headset, a wearable controller, joystick, etc.), a robot or robotics device, a medical device (e.g. an endoscope), an augmented reality system, an augmented reality device, a virtual reality system, a virtual reality device, a wearable device (e.g. a watch, a smartwatch, a fitness tracker, etc.), a drone (aerial, water, underwater, etc.), an aircraft, a spacecraft, a submersible vessel, a vehicle, and an autonomous vehicle (e.g. a driverless car), a tool, a surgical tool, a remote controller (e.g. for a drone or a consumer electronics device), clothing (e.g. a garment, shoes, etc.), a switch, dial or button (e.g. a light switch, a thermostat dial, etc.), a display screen, a touchscreen, a flexible surface, and a wireless communication device (e.g. near-field communication (NFC) device). It will be understood that this is a non-exhaustive list of example devices.

The actuator assembly described herein may be used in devices/systems suitable for image capture, 3D sensing, depth mapping, aerial surveying, terrestrial surveying, surveying in or from space, hydrographic surveying, underwater surveying, scene detection, collision warning, security, facial recognition, augmented and/or virtual reality, advanced driver-assistance systems in vehicles, autonomous vehicles, gaming, gesture control/recognition, robotic devices, robotic device control, touchless technology, home automation, medical devices, and haptics.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An actuator assembly comprising:

a first part comprising a first stop;

a second part comprising a second stop; and, a helical bearing arrangement arranged to guide helical movement of the second part with respect to the first part around a helical axis such that rotation of the second part around the helical axis is converted into helical movement of the second part, wherein the first stop and the second stop are arranged such that the stops are spaced from each other throughout an operating range of said helical movement of the second part relative to the first part, and wherein the first stop and the second stop are configured to engage each other if the second part is moved relative to the first part in at least one direction other than the direction of said helical movement such that the engagement of the stops restricts relative movement of the first and second parts.

2. The actuator assembly according to claim 1, wherein the at least one direction other than the direction of said helical movement is perpendicular to the direction of said helical movement.

3. The actuator assembly according to claim 1, wherein the stop of the first part comprises a first surface that is helically arranged and/or the stop of the second part comprises a second surface that is helically arranged.

4. The actuator assembly according to claim 1, wherein the stops are spaced by a constant distance in a first direction during at least a portion of said helical movement of the second part relative to the first part, and wherein the stops are configured to engage when the stop of the second part is moved relative to the stop of the first part in said first direction.

5. The actuator assembly according to claim 4, wherein the stops are arranged such that the stops are spaced by the constant distance in the first direction over the entire range of said helical movement of the second part relative to the first part.

6. The actuator assembly according to claim 4, wherein the stops are arranged such that the stops are spaced by a constant distance in the first direction during a first portion of said helical movement of the second part relative to the first part, wherein the first and second parts each comprise respective second stops that are arranged such that the second stops are spaced by a constant distance during a second portion of said helical movement of the second part relative to the first part.

7. The actuator assembly according to claim 4, wherein the constant distance is at least 50 microns and less than 250 microns.

8. The actuator assembly according to claim 1, wherein one of the first and second parts comprises a track that comprises the stop of said one of the first and second parts and the other one of the first and second parts comprises a protrusion for being received in the track, wherein the protrusion comprises the stop of said other one of the first and second parts.

9. The actuator assembly according to claim 1, wherein the helical bearing arrangement comprises a plurality of tracks and a plurality of bearing elements that are each received in a respective track and the helical bearing arrangement comprises three tracks.

10. The actuator assembly according to claim 9, wherein the tracks are disposed at first, second and third positions respectively about the helical axis and wherein the stops are located at a fourth position about the helical axis, and wherein the first, second, third and fourth positions are spaced at 90 degree intervals about the helical axis.

11. The actuator assembly according to claim 1, further comprising a loading arrangement, wherein the stops are disposed in closer proximity to the loading arrangement than to the helical bearing arrangement.

12. The actuator assembly according to claim 11, wherein the loading arrangement is a magnetic loading arrangement.

13. The actuator assembly according to claim 11, wherein one of the first and second parts comprises a track that comprises the stop of said one of the first and second parts and the other one of the first and second parts comprises a protrusion for being received in the track, wherein the protrusion comprises the stop of said other one of the first and second parts, wherein at least a portion of the loading arrangement is fixed relative to the protrusion.

14. The actuator assembly according to claim 11, wherein the loading arrangement is configured to urge the second part relative to the first part in a direction generally perpendicular to the helical movement of the second part relative to the first part.

15. The actuator assembly according to claim 1, wherein the first part comprises one or more further stops and the second part comprises one or more further stops each corresponding to the one or more further stops of the first part, wherein corresponding ones of the further stops are arranged so as to be spaced from each other throughout an operating range of said helical movement of the second part relative to the first part.

16. The actuator assembly according to claim 15, wherein each further stop of the first part and corresponding further stop of the second part are spaced by a constant distance in a further direction during at least a portion of said helical movement of the second part relative to the first part and are configured to engage if the further stop of the second part is moved relative to the further stop of the first part in said further direction, wherein at least one of the further directions is at an angle to the first direction and, preferably, is perpendicular to the first direction.

17. The actuator assembly according to claim 15, wherein the stops and further stops together restrict movement of the second part relative to the first part other than said helical movement of the second part relative to the first part.

18. The actuator assembly according to claim 1, wherein the second part comprises first and second sides and an end stop that is arranged on one of the first and second sides and, preferably, wherein the first part comprises an end stop and wherein the end stop of the second part moves towards or away from the end stop of the first part during helical movement of the second part relative to the first part.

19. The actuator assembly according to claim 1, comprising a drive mechanism configured to drive rotation of the second part around the helical axis which the helical bearing arrangement converts into the helical movement of the second part.

20. A camera system comprising:

the actuator assembly of claim 1;

an image sensor; and a lens system;

wherein the image sensor is mounted to one of the first part and the second part, and wherein the lens system is mounted to the other one of the first part and second part.

* * * * *